United States Patent [19]
Mahoney et al.

[11] Patent Number: 5,305,395
[45] Date of Patent: Apr. 19, 1994

[54] EXHAUSTIVE HIERARCHICAL NEAR NEIGHBOR OPERATIONS ON AN IMAGE

[75] Inventors: James V. Mahoney, Sunnyvale, Calif.; David T. Clemens, Somerville, Mass.

[73] Assignee: Xerox Corporation, Stamford, Conn.

[21] Appl. No.: 535,438

[22] Filed: Jun. 8, 1990

[51] Int. Cl.$^5$ .............................................. G06K 9/00
[52] U.S. Cl. ...................................... 382/27; 382/37; 382/55
[58] Field of Search ............................ 382/27, 37, 55

[56] References Cited

U.S. PATENT DOCUMENTS

| | | | |
|---|---|---|---|
| 2,838,602 | 6/1958 | Sprick | 178/15 |
| 2,983,822 | 5/1961 | Brouillette, Jr. | 250/202 |
| 3,297,989 | 1/1967 | Atchley et al. | 340/146.3 |
| 3,339,179 | 8/1967 | Shelton, Jr. et al. | 382/55 |
| 3,605,093 | 9/1971 | Parks et al. | 382/37 |
| 4,208,652 | 6/1980 | Marshall | 382/27 |
| 4,371,865 | 2/1983 | Moulton | 382/27 |
| 4,799,270 | 1/1989 | Kim et al. | 382/37 |
| 4,802,230 | 1/1989 | Horowitz | 382/22 |
| 5,022,091 | 6/1991 | Carlson | 382/49 |
| 5,054,094 | 10/1991 | Barski | 382/18 |
| 5,193,125 | 3/1993 | Mahoney | 382/41 |

OTHER PUBLICATIONS

Borgefors, G., "Distance Transformations in Digital Images", *Computer Vision Graphics and Imaging Processing*, vol. 34, (1986), pp. 344–371.

Ahuja, N., and Schachter, B. J., *Pattern Models*, John Wiley and Sons, New York, 1983, Chapter 1, pp. 1–73.

Mahoney, J. V., *Image Chunking: Defining Spatial Building Blocks for Scene Analysis*, Dep't. of Elec. Eng. and Comp. Sci., M.I.T., 1987, ("the Mahoney thesis"), pp. 31–37.

Mahoney, J. V., "Exhaustive Directional Neighbor Linking and its Role in Image Analysis", *Canadian Psychology/Psychologie Canadienne*, May 1989, vol. 30, No. 2a, p. 440, Abstract.

Koch, C., and Ullman, S., "Selecting One Among the Many: A Simple Network Implementing Shifts in Selective Visual Attention", MIT Artificial Intelligence Laboratory, A.I. Memo 770, Jan. 1984, pp. 1–18.

*Primary Examiner*—Leo H. Boudreau

[57] ABSTRACT

Near neighbor data is produced hierarchically for each pixel of an image. Each pixel's near neighbor data indicates the presence of an approximate near neighbor pixel in each of four quadrants with respect to the pixel, and can also indicate distance and orientation to the near neighbor pixel. The near neighbor data can be produced by parallel processing units, with each processing unit producing, for a respective pixel, a near neighbor data item at every level of the hierarchy. Each near neighbor data item can indicate the presence of an approximate near neighbor in a respective region of the image. A near neighbor data item for a higher level region can be produced by selecting between near neighbor pixels indicated by near neighbor data items for subregions at the next lower level, by choosing the near neighbor pixel that is nearer. The quadrants can be asymmetric so that each pixel is not included in any of its four quadrants and so that the quadrants do not overlap. To provide accurate near neighbor data for a black pixel, the near neighbor data can be shifted to the black pixel from the adjacent pixels, each at the origin of one of its quadrants. Offsets in the near neighbor data can also be adjusted accordingly. Each processing unit can store a bit vector such that the bit vectors together indicate the paths between neighbor pixels and owner pixels, to facilitate subsequent communication between owners and neighbors. Each bit of the bit vector can indicate, for each level of the hierarchy, which of the processing unit's children is on the path at the next lower level. A path defined in this manner can be followed to shift focus from a current focus pixel to one of its near neighbors.

31 Claims, 13 Drawing Sheets

EXHAUSTIVE HIERARCHICAL NEAR NEIGHBOR OPERATIONS ON AN IMAGE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data. More specifically, the invention relates to techniques that analyze an image by finding near neighbors of pixels in the image.

Borgefors, G., "Distance Transformations in Digital Images," *Computer Vision Graphics and Image Processing*, Vol. 34 (1986), pp. 344–371, describes distance transformations that convert a binary digital image, consisting of feature and non-feature pixels, into an image where each non-feature pixel has a value corresponding to the distance to the nearest feature pixel. To compute the distances with global operations would be prohibitively costly; the paper describes digital distance transformation algorithms that use small neighborhoods and that give a reasonable approximation of distance. Page 345 explains that such algorithms are based on approximating global distances in the image by propagating local distances, i.e. distances between neighboring pixels. The distance transformations are described in graphical form as masks, as shown in FIG. 2; the local distance in each mask-pixel is added to the value of the image pixel below it and the minimum of the sums becomes the new image pixel value. Parallel computation of such a distance transformation requires a number of iterations proportional to the largest distance in the image. Section 3, beginning on page 347, describes optimal distance transformations for different image sizes. Section 4, beginning on page 362, compares several examples, including computing the distance from an object or object contour, in Section 4.3, and computing a pseudo-Dirichlet or Voronoi tessellation, in Section 4.4.

Ahuja, N., and Schachter, B. J., *Pattern Models*, John Wiley and Sons, New York, 1983, Chapter 1, pp. 1–73, describe tessellations beginning at page 4. Section 1.3.5, beginning on page 15, describes Voronoi and Delaunay tessellations, indicating that a Voronoi polygon is the locus of points closer to a vertex than to any other vertex and that the Delaunay triangulation is a dual of a Voronoi tessellation. Algorithms for constructing the Delaunay triangulation are described beginning at page 22. Section 1.3.5.4, beginning on page 32, describes the use of the Voronoi polygon for neighborhood definition, reviewing other techniques for defining the neighborhood of a point and comparing them with the Voronoi approach. FIGS. 1.3.5.4-2 shows how Voronoi neighbors of a point may be farther from it than non-neighbors, because Voronoi neighbors are not necessarily its nearest neighbors—the Voronoi neighbors of a point must surround it.

Mahoney, J. V., *Image Chucking: Defining Spatial Building Blocks for Scene Analysis*, Dep't. of Elec. Eng. and Comp. Sci., M.I.T., 1987 ("the Mahoney thesis"), pp. 31–37, describes techniques for detecting abrupt change boundaries by direct comparisons between neighboring elements. Pages 32–34 describe the directional nearest neighbor graph, useful for computing an explicit representation of the neighbors of each image property element, and compare it to the Voronoi dual.

SUMMARY OF THE INVENTION

One aspect of the invention is based on the recognition of a problem in conventional techniques for finding near neighbors of a pixel in an image. A near neighbor is a pixel that meets an appropriate criterion, such as the nearest black pixel in a binary image.

Some conventional techniques find near neighbors for only a subset of the pixels of an image, for example, just the black pixels. Such techniques include serial techniques for Delaunay triangulation and for finding the Voronoi dual and also techniques that find k-nearest neighbors or that find near neighbors using grids. In general, these techniques are not designed to find near neighbors for every pixel in the image. Therefore, these techniques do not allow computation of near neighbor information at every pixel.

On the other hand, some techniques have been developed that find near neighbor information for every pixel in an image. Such a technique is referred to herein as an exhaustive near neighbor technique. For example, the distance transformation techniques described in the Borgefors article discussed above are exhaustive near neighbor techniques. Also, the grass fire algorithm for finding a Voronoi diagram is an exhaustive near neighbor technique. These techniques are not very efficient, typically requiring time linearly proportional to the longest straight-line distance in the image.

This aspect of the invention is further based on the discovery of a more efficient exhaustive near neighbor technique. This technique finds approximate near neighbors in time proportional to the logarithm of the diameter, i.e. the longest dimension of the image. The technique analyzes an image and produces a hierarchy of data items. For a given pixel, the hierarchy includes a respective tree of data items that indicates an approximate near neighbor. Therefore, near neighbors for every pixel can be found in parallel by producing respective trees for all pixels in parallel. All levels of the resulting hierarchy can have the same number of nodes as the number of pixels in the image, in which case the hierarchy itself is referred to herein as an exhaustive hierarchy.

An approximate near neighbor for a pixel can be found by operating hierarchically on near neighbor data for regions of the image. If a region R that includes a pixel $P_0$ has subregions $S_1, S_2, \ldots$ and if approximate near neighbors are known for reference points $P_1, P_2, \ldots$ in $S_1, S_2, \ldots$ respectively, then an approximate near neighbor for $P_0$ can be selected from the approximate near neighbors of $P_1, P_2, \ldots$ based on the relative positions of $P_0, P_1, P_2, \ldots$ Although this technique can, in general, be applied to a region of arbitrary shape with an arbitrary number of subregions, it is especially useful with rectangular regions and subregions. For example, R can be rectangular with $P_0$ in its upper left-hand corner, with two rectangular subregions $S_1$ and $S_2$ with $P_1$ and $P_2$ in their respective upper left-hand corners, and with $P_0 = P_1$. In this case, the approximate near neighbor for $P_0$ can be selected from the approximate near neighbors of $P_1$ and $P_2$ based on the distance from $P_1$ to $P_2$ and on the distances from $P_1$ and $P_2$ to their respective near neighbors.

This technique can be implemented by performing an upward hierarchical pass to produce near neighbor data for rectangular regions of an image. The lowest level of the hierarchy can include a data item for each pixel indicating whether the pixel meets a near neighbor criterion. The upward pass can apply the criterion to select, for each of a hierarchy of rectangular regions of the image, an approximate near neighbor of a corner of the region. The upward pass obtains, for each region's corner, an exact distance to its approximate near neighbor.

This hierarchical technique can be implemented with very simple, fast operations performed by simple parallel processing elements with connections for local, uniform communication. Interconnections such as a tree or hypercube can provide uniform communication across power-of-two x and y offsets in a fixed time that depends on image size. When implemented with such interconnections, this technique can produce approximate near neighbors for an image of diameter N in time proportional to log N, which is substantially more efficient than the conventional techniques that find true near neighbors. With a parallel processor array interconnected by a rectangular grid, this technique produces approximate near neighbors in time on the order of N log N.

Another aspect of the invention is based on the recognition of another problem that arises in finding near neighbors. Conventional techniques that find a limited number of near neighbors may ignore most orientations if several near neighbors are concentrated around one orientation, resulting in a directional form of "blindness."

This aspect is further based on the discovery that this problem can be alleviated by finding near neighbors separately in each of a number of discrete zones of orientation that together cover all orientations. The separate results for each zone can subsequently be combined if necessary to produce a result for all orientations. The operations for the zones can be hierarchical operations and can be performed on the zones in a sequence.

It is computationally impractical, however, to separately obtain near neighbors for each of a very large number of zones of orientations for each pixel in an image. This problem can be solved by using a small number of zones that together cover all orientations. The zones could, for example, be quadrants.

A closely related aspect of the invention is based on the further recognition of problems that arise in operating on quadrants or other discrete zones of orientation in this manner. If the zones of orientation in a discrete input array, such as the pixel values defining an image, all emanate from a given pixel, and if each region includes the given pixel, the quadrants overlap. Furthermore, if a near neighbor operation is performed with a criterion such as that a near neighbor must be a black pixel, and the given pixel meets the criterion, then the given pixel is its own nearest neighbor in all the quadrants, a result that is neither interesting nor useful. On the other hand, if the row and column of pixels that include the given pixel are excluded from all the quadrants, the near neighbor operation does not find pixels in the row and column even though they meet the near neighbor criterion.

This aspect is based on the discovery that these problems can be solved if each zone of orientation is asymmetric, including pixels on the line along one of its sides but excluding all of the pixels on the line along the other side. This simple, elegant solution avoids overlapping quadrants and quadrants that are separated by gaps. If a pixel's adjacent pixel in a given asymmetric quadrant does not meet its near neighbor criterion, the near neighbor operation can shift the offset of the adjacent pixel and adjust it to produce the pixel's near neighbor offset.

Another aspect of the invention is based on the recognition that identification of a pixel's near neighbor allows operations on data indicating attributes of the pixel, called the "owner," and of its near neighbor. Such operations can be performed locally, however, only if data indicating an attribute of the pixel and data indicating an attribute of its near neighbor are available locally. If the attribute data for each pixel is produced or stored at a respective location within a system, this requires communication between the respective locations for the two pixels.

A partial solution to this problem is to pass data from the respective location for a pixel that meets the near neighbor criterion to the owner pixel's respective location during the hierarchical operation that produces near neighbor data. At each step in the hierarchical operation, if the pixel meets the near neighbor criterion for a region, and therefore has an owner pixel in one corner of the region, the data is transmitted to the owner's respective location. If an exhaustive hierarchical operation is performed, this technique transmits the data to the respective locations of all of the owners of a given near neighbor.

After the near neighbor data has been produced, more efficient communication is possible in either direction if the hierarchical path between an owner and its near neighbor is somehow remembered. This aspect of the invention is based on the discovery that a relatively small amount of data stored at each node in a hierarchy is sufficient to define the hierarchical paths necessary for all near neighbor communication in a given quadrant. This leads to a moderate improvement in speed of communication because distance calculations and comparisons need not be redone. For example, in a parallel implementation in which each node of a binary hierarchy has a respective processing unit, a single bit is sufficient to indicate which one of the processing unit's children is on the path. In a flat parallel or in-place implementation in which each processing unit produces a data item for a respective node at every level of the hierarchy, the hierarchical path data in each processing unit can be a bit vector with a respective bit for each level of the hierarchy, each respective bit indicating which child is on the path.

For communication from near neighbor to owner, the paths are followed by using the appropriate bit at a node to determine from which of the children of the node to accept a transmission. For communication from owner to near neighbor, the paths are followed by using the appropriate bit at a node to determine to which of the children of the node to send a transmission.

A closely related aspect of the invention is based on the recognition that parallel communication from owner to near neighbor results in collisions, because each near neighbor pixel ordinarily has a number of owners, and the attribute values communicated by the owners may differ. This problem can be solved by collision resolution, such as by accepting only the first value to arrive, by allowing later values to overwrite previous values, or by combining the colliding values using a function such as the maximum or minimum.

Another aspect of the invention is based on the recognition of a problem that arises in shifting focus within an image during parallel image analysis. Even with parallel techniques, many image analysis operations would be computationally impractical if it were necessary to perform them globally on all pixels of an image, including those parts of the image that are not relevant. But such an operation may be practical if performed only on a current focus pixel, ignoring irrelevant parts of the image in a manner analogous to an attention mechanism. Parallel techniques that operate only on a current focus pixel therefore require mechanisms for defining and shifting a current focus. It would be advantageous to have a technique for shifting focus that could be based on operations that find near neighbors.

This aspect of the invention is further based on the discovery of parallel near neighbor techniques for shifting focus. Parallel near neighbor operations can be performed to produce near neighbor attribute data indicating attributes for each of a set of near neighbor pixels of the current focus pixel and to store data at the processing units defining paths from the current focus pixel to each of the near neighbor pixels. The attributes could include attributes of links to the near neighbors or of the near neighbors themselves. A criterion can be applied to the near neighbor attribute data to select one of the near neighbor pixels, and the current focus can be shifted to the selected pixel by following the appropriate path from the current focus pixel to the selected pixel.

The near neighbor attribute data can, for example, indicate the distance or relative orientation between the current focus pixel and each of its near neighbor pixels; in these cases, the criterion could select the pixel nearest to the previous focus pixel or the pixel whose orientation relative to the previous focus pixel is closest to a given orientation. The near neighbor attribute data could also include data read from each of the near neighbor pixels, in which case the criterion could select the pixel with an attribute value closest to the attribute value of the previous focus pixel.

When the new focus pixel has been selected, a hierarchical operation can be performed to shift the current focus to the selected pixel by following the appropriate path. This can be a single downward pass, in effect writing from the previous focus pixel to the new focus pixel.

The following description, the drawings, and the claims further set forth these and other objects, features and advantages of the invention.

DETAILED DESCRIPTION

A. Conceptual Framework

Figure 1:
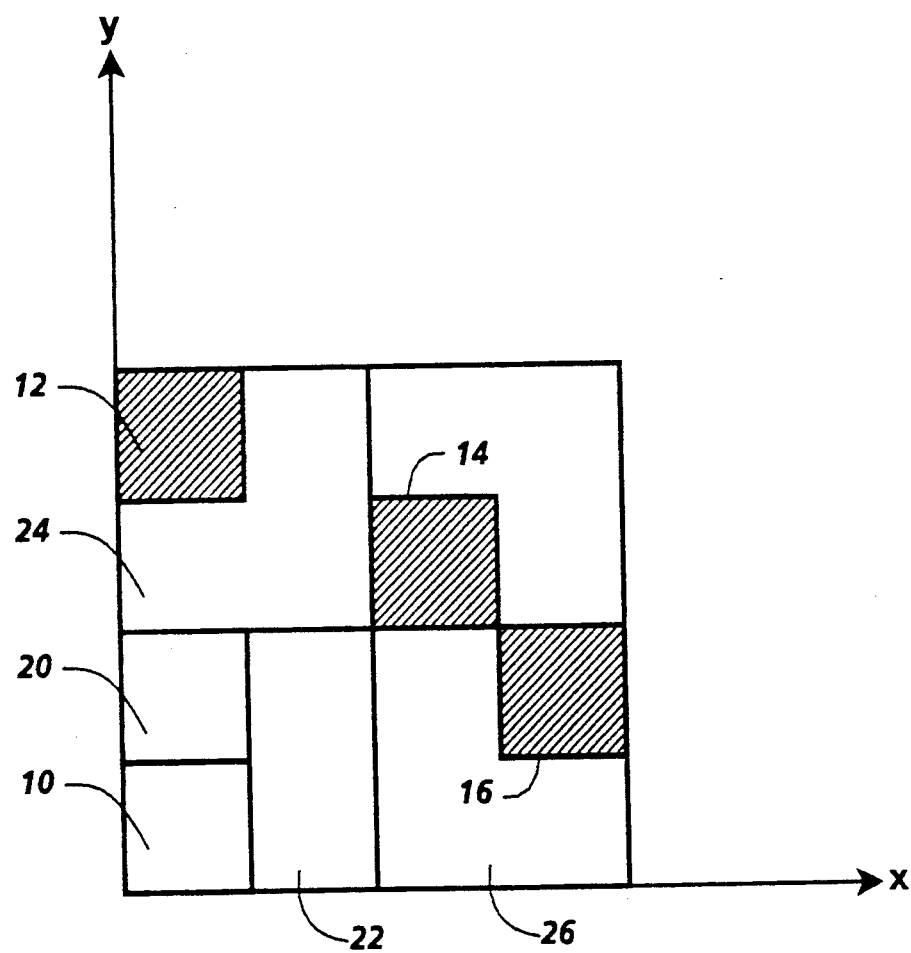
FIG. 1 is a schematic drawing showing an arrangement of pixels in an image with coordinate axes.

The following conceptual framework is helpful in understanding the broad scope of the invention, and the terms defined below have the meanings indicated throughout this application, including the claims. This conceptual framework is an extension of that set forth in the copending, coassigned U.S. patent application Ser. No. 07/535,796, entitled "Dense Aggregative Hierarchical Techniques for Data Analysis" ("the architecture application"), which is incorporated herein by reference in its entirety.

A "data processor" or "processor" is any component, combination of components, or system that can process data, and may include one or more central processing units or other processing components. A "processing unit" is a processor that is a component within another processor. Two processing units are "connected" by any combination of connections between them that permits communication of data from one of the processing units to the other.

"Memory" is any component, combination of components, or system that can store data, and may include local and remote memory and input/output devices.

A processor "accesses" data or a data structure by any operation that retrieves or modifies the data or data included in the data structure, such as by reading or writing data at a location in memory. A processor can be "connected for accessing" data or a data structure by any combination of connections with memory that permits the processor to access the data or the data structure.

A "data structure" is any combination of interrelated items of data. An item of data is "included" in a data structure when it can be accessed using the locations or data of other items in the data structure; the included item of data may be another data structure. An "array of data" or "data array" or "array" is a data structure that includes items of data that can be mapped into an array. A "two-dimensional array" is a data array whose items of data can be mapped into an array having two dimensions.

A processor "operates on" data or a data structure by performing an operation that includes obtaining a logical or numerical result that depends on the data or data structure.

To "obtain" or "produce" data or a data structure is to perform any combination of operations that begins without the data or the data structure and that results in the data or data structure. Data or a data structure can be "obtained from" or "produced from" other data or another data structure by any combination of operations that obtains or produces the data or data structure by operating on the other data or on data in the other data structure. For example, an array can be obtained from another array by operations such as producing a smaller array that is the same as a part of the other array, producing a larger array that includes a part that is the same as the other array, copying the other array, or modifying data in the other array or in a copy of it.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the beginning. In other words, a hierarchy may be produced by a combination of operations that ends when all of the data items of the hierarchy have been produced, whether or not all of the data items are still stored. All of the data items of all of the levels could still be stored at the end of the operations, but the hierarchy is produced even though some of the data items are not stored after being used to produce data items at a higher level.

To produce a hierarchy "sequentially" is to produce the hierarchy by a sequence of substeps in which the first substep produces a first higher level of data items from a lowest level of data items, the second substep produces a second higher level of data items from the first higher level, and so forth.

Data "indicates" an attribute when the data indicates the presence of the attribute or a measure of the attribute. An "aggregative data item" is an item of data that indicates an attribute of a group of other data items. In a hierarchy of data items, a given level can include aggregative data items, each of which indicates an attribute of a respective group of data items of the next lower level of the hierarchy.

An "aggregative operation" is an operation on a set of data items, called input data items below, that produces a set of aggregative data items, called resulting data items below, with each of the aggregative data items being produced by operating on a respective set of the input data items. The respective sets of input data items are "evenly distributed" in relation to the complete set of input data items if each of the input data items is included in roughly the same number of respective sets of input data items as every other input data item and if no two of the respective sets are identical.

If the respective sets of input data items on which an aggregative operation is performed are all of the same size a, the "aggregation degree" of the aggregative operation is equal to a. More generally, the respective sets of input data items could each have one of a small number of different sizes $a_1, a_2, \ldots$ For the aggregative operations discussed below, a is generally greater than 1 and small compared to the number of input data items, except as otherwise indicated.

The "density" of aggregative operation is the ratio c of the number of resulting data items to the number of input data items. This ratio can be related to the aggregation degree a as follows, assuming in each case that the respective sets are evenly distributed: A "minimal aggregative operation" is one for which c is approximately equal to 1/a, so that each of the input data items is in one of the respective sets of input data items. A "dense aggregative operation" is one for which c is not substantially less than 1, so that each of the input data items is in not substantially less than a respective sets of input data items. An "exhaustive aggregative operation" is a dense aggregative operation for which c is equal to 1, so that each of the input data items is in a respective sets of input data items.

A "hierarchical aggregative operation" is a combination of operations that sequentially produce a hierarchy and in which each substep of the sequence is an aggregative operation. An "aggregative hierarchy" is a hierarchy produced by a hierarchical aggregative operation. An aggregative hierarchy can be described as "minimal," "exhaustive," or "dense" if all of the substeps of the hierarchical aggregative operation that produces it are minimal, exhaustive, or dense, respectively. A "mixed aggregative hierarchy" is produced by a hierarchical aggregative operation that includes aggregative operations of varying densities, possibly including minimal, exhaustive, and other densities that are between minimal and exhaustive or greater than exhaustive.

An "image" is a pattern of light. Data "defines" an image or another signal when the data includes sufficient information to produce the image or signal. For example, an array can define all or any part of an image, with each item of data in the array providing a value indicating the color of a respective location of the image.

A "dimensioned body of data" is a body of data that maps into a space that includes one or more dimensions. For example, an array that defines a two-dimensional image is a dimensioned body of data. A "geometric structure" is a configuration of data items that occurs in a dimensioned body of data. Examples of geometric structures include points; relations among points; properties of points, such as color, surface orientation, or depth; configuration of points, such as lines and curves, line junctions, corners, angles, connected regions, region boundaries, surfaces, solids; and so forth.

Each location in an image may be called a "pixel." In a body of data defining an image in which each item of data provides a value, each value indicating the color of a location may be called a "pixel value." Each pixel value is a bit in the "binary form" of the image, a grey-scale value in a "grey-scale form" of the image, or a set of color space coordinates in a "color coordinate form" of the image, the binary form, grey-scale form, and color coordinate form each being a body of data defining the image.

A "connected component" or "blob" is a set of pixels in an image, all of which have pixel values that meet a criterion and all of which are pairwise connected through an appropriate rule such as that the pixels in a pair are connected by a chain of neighbors within the set. For example, a connected component of a binary form of an image can include a connected set of pixels that have the same binary value, such as black.

A "data space" is a space into which the data items of a dimensioned body of data can be mapped. In general, a number of bodies of data can be mapped into the same data space. For example, arrays defining many different images can all be mapped into the same two-dimensional data space.

An "analysis region" or "region" of a data space or of any of the bodies of data that can be mapped into the data space is a bounded part of the data space, defined without regard to the values of the data items mapped into the analysis region. A region of the array defining an image defines an analysis region of the image, so that an aggregative data item defines an attribute of an analysis region of an image when it indicates an attribute of the data items in an analysis region of the array defining the image. The attribute could, for example, be the presence of exactly one connected component in a respective analysis region. The size and position of the aggregative data item's respective analysis region do not depend on the presence or absence of a connected component, but rather on the set of data items on which operations are performed to produce the aggregative data item. An image is therefore divided into analysis regions by the aggregative operations performed on an array defining the image in a way that does not depend on the pixel values in the image. Typically, each pixel value is in at least one analysis region at the lowest level of the hierarchy, and the analysis regions of each higher level are formed by combining analysis regions of the next lower level. Analysis regions "overlap" if they share one or more pixels.

An item of data is produced by "combining" other items of data when logical or arithmetic operations are performed on the other items of data that yield an item of data of the same type. For example, if the other items of data are simple booleans, the combined item of data is a simple boolean. If the other items of data are numbers, the combined item of data could be a number, produced by adding the other items of data, calculating the mean of the other items of data, selecting one of the other items of data, or a similar operation that produces a number.

Data items in a pair are "disjoint" if the sets of data items on which operations are performed in producing each of them are mutually exclusive. The data items in a group of data items are all "disjoint" if they are pairwise disjoint. For example, if each data item of a group indicates an attribute of a respective analysis region of an image and if the respective analysis regions do not overlap then the data items are all disjoint.

A "power-of-two offset" within an array that defines a dimensioned body of data is an offset that spans one of the integral exponential powers of two, e.g. $2^0=1$, $2^1=2$, $2^2=4$, etc.

An operation "encodes" data items when performing the operation on the data items produces different data from which the encoded data items can subsequently be recovered.

An "image input device" is a device that can receive an image and provide a signal defining a version of the image. A "scanner" is an image input device that receives an image by a scanning operation, such as by scanning a document. A "user input device" is a device such as a keyboard or a mouse that can provide signals based on actions of a user. The data from the user input device may be a "request" for an operation, in which case the system may perform the requested operation in response. An "image output device" is a device that can provide an image as output. A "display" is an image output device that provides information in visual form, such as on the screen of a cathode ray tube.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

An "edge" occurs in an image when two neighboring pixels have different pixel values. The term "edge pixel" may be applied to one or both of the two neighboring pixels.

A "border" of a polygonal region, such as a rectangle, is the line of pixels at the perimeter of the region along one of its sides. A "boundary" of a region is a perimeter, defined by the portions of the boundaries of its pixels along which those pixels either have no neighboring pixels or have neighboring pixels that are not in the region. A connected component "crosses" a boundary of a region if the connected component includes a pair of neighboring pixels that are on opposite sides of the boundary, one being in the region and the other not being in the region.

Given two orientations, $\theta_1$ and $\theta_2$, defined in the range 0° to 360°, the "orientation difference" $\Delta_\theta(\theta_1, \theta_2)$ is defined as $[\min(\theta_h-\theta_l,(\theta_l+360)-\theta_h)]$, where $\theta_h=\max(\theta_1, \theta_2)$ and $\theta_l=\min(\theta_1, \theta_2)$, and the "acute orientation difference" $\delta_\theta(\theta_1, \theta_2)$ is defined as $[\min(\theta_h-\theta_l,(\theta_l+180)-\theta_h)]$, where $\theta_h=\max(\mod(\theta_1, 180),\mod(\theta_2, 180))$, $\theta_l=\min(\mod(\theta_1, 180),\mod(\theta_2, 180))$.

B. General Features

Figure 2:
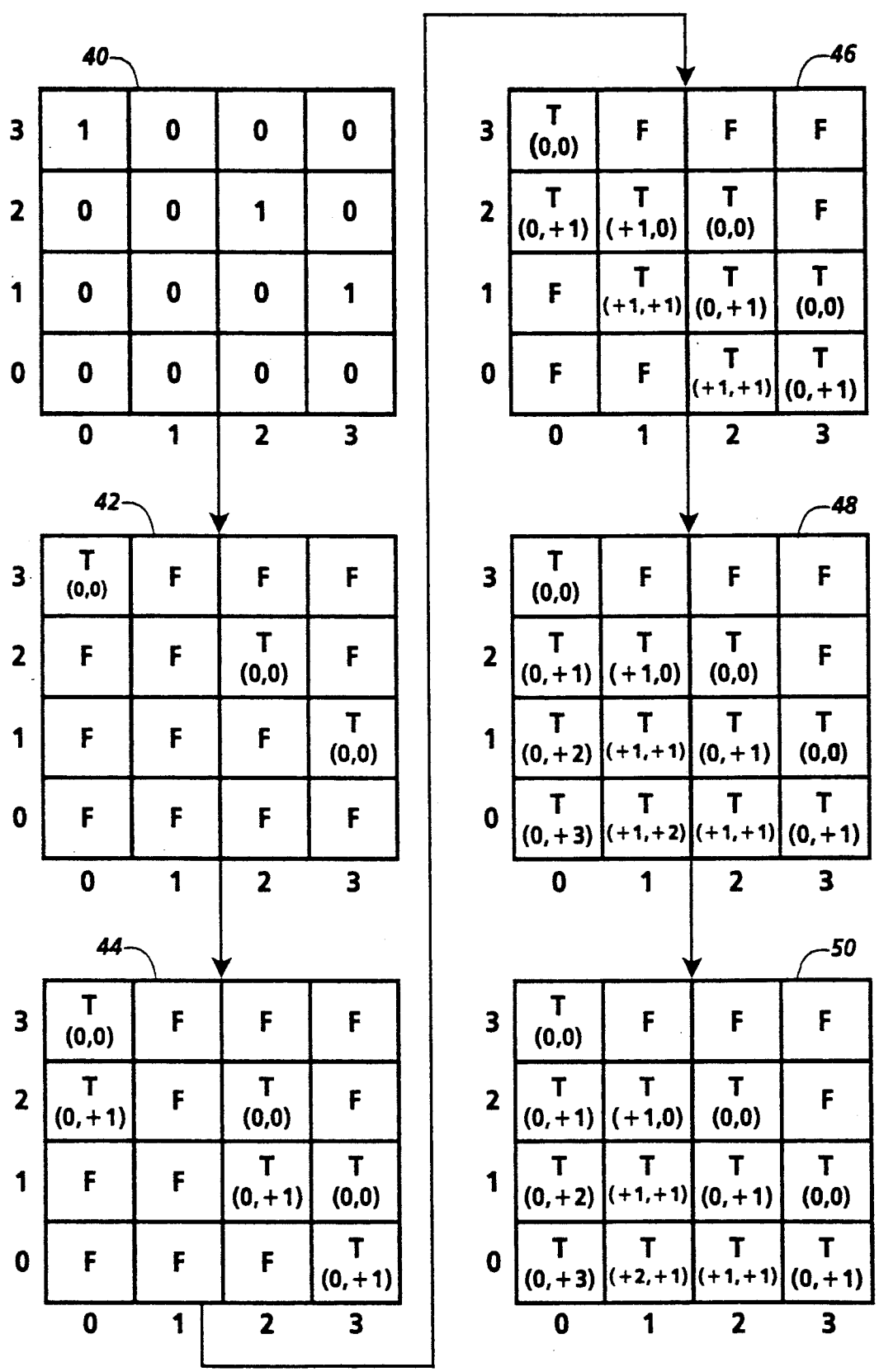
FIG. 2 is a flow diagram showing a sequence of arrays of data produced according to the invention.
Figure 3:
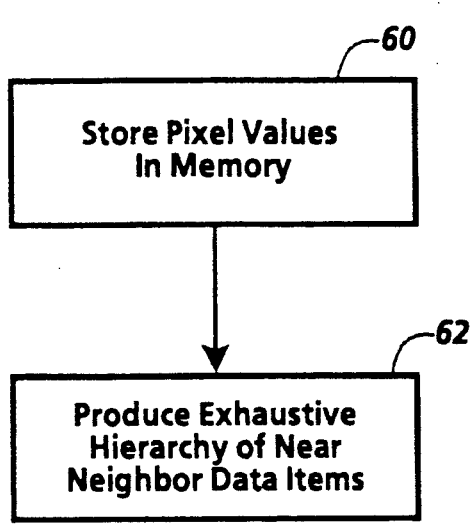
FIG. 3 is a flow chart showing general steps in producing near neighbor data according to the invention.
Figure 5:
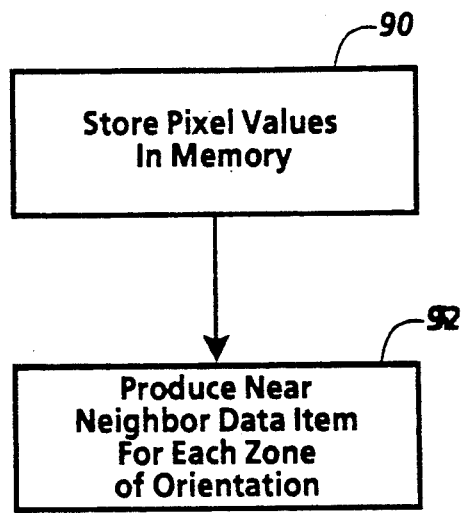
FIG. 5 is a flow chart showing general steps in producing near neighbor data for zones of orientation according to the invention.
Figure 4:
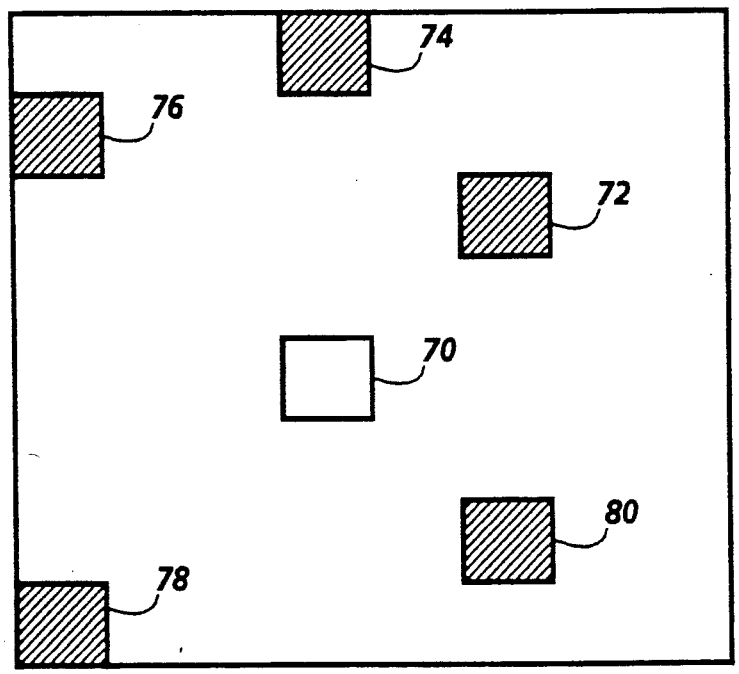
FIG. 4 is a schematic drawing showing an arrangement of pixels in an image.
Figure 6:
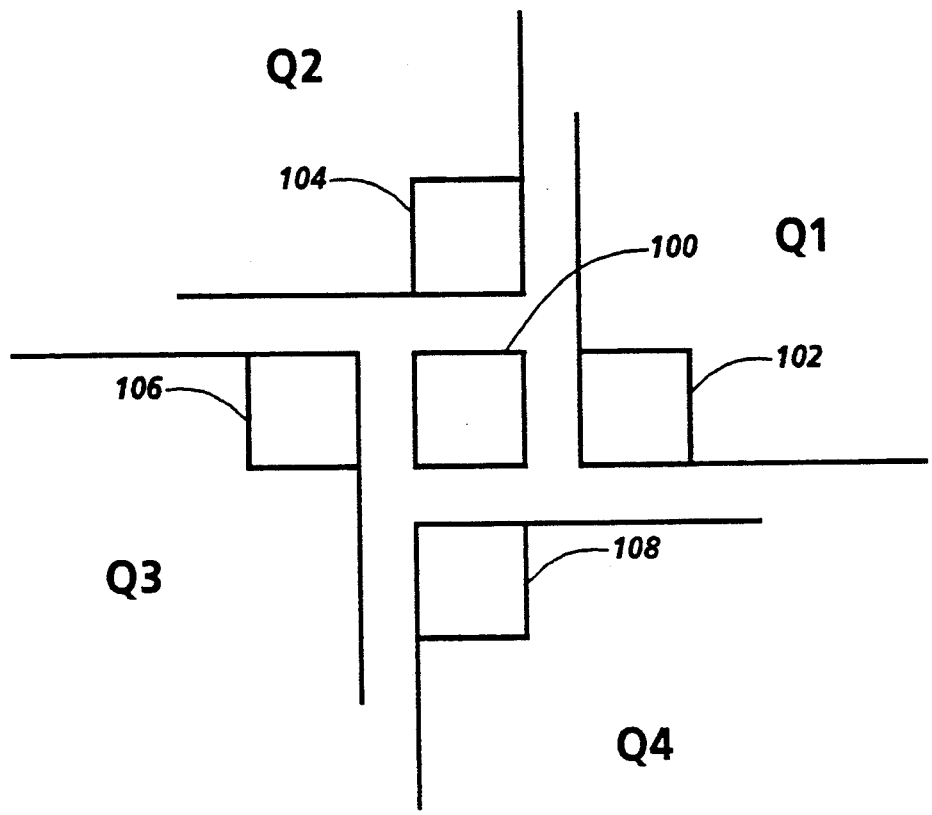
FIG. 6 is a schematic diagram of pixels showing asymmetric quadrants according to the invention.
Figure 7:
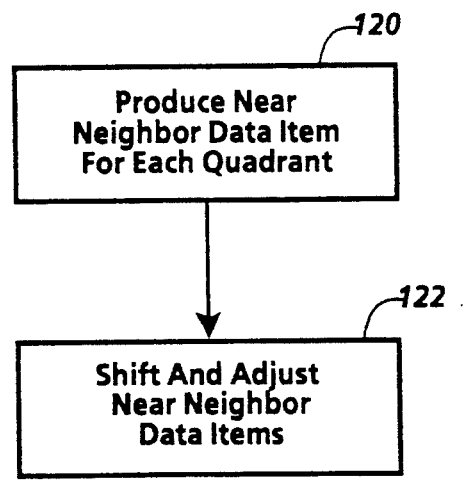
FIG. 7 is a flow chart showing general steps in shifting and adjusting near neighbor data for asymmetric quadrants.
Figure 8:
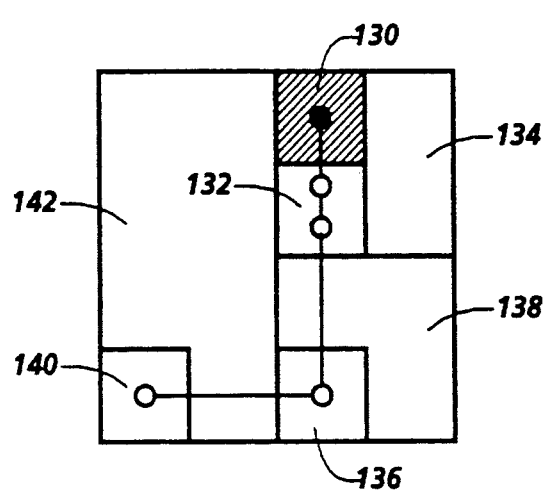
FIG. 8 is a schematic diagram of an arrangement of pixels showing a path from a neighbor pixel to an owner pixel.
Figure 9:
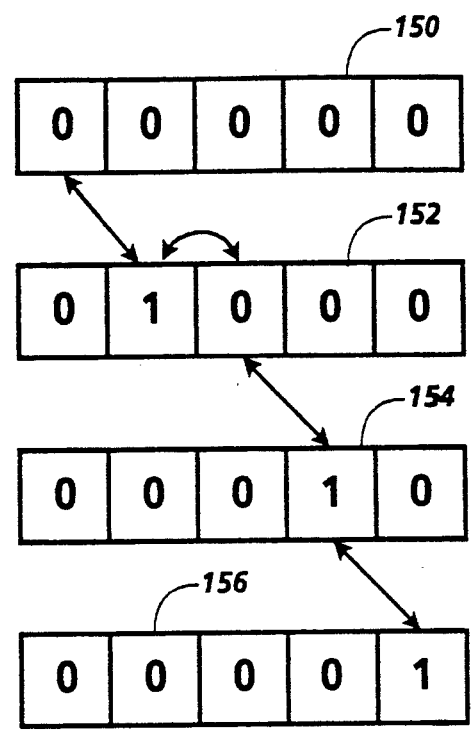
FIG. 9 is a schematic diagram of bit vectors storing data defining a path from a neighbor pixel to an owner pixel.
Figure 10:
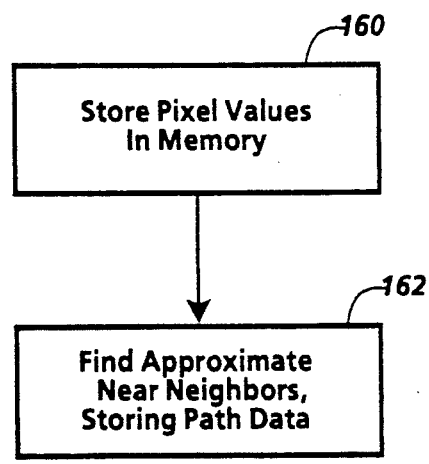
FIG. 10 is a flow chart showing general steps in storing path data according to the invention.
Figure 11:
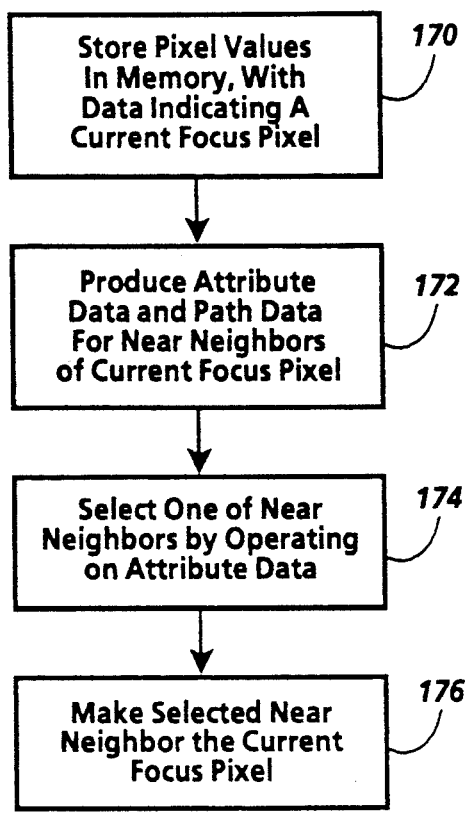
FIG. 11 is a flow chart showing general steps in shifting focus according to the invention.

FIGS. 1–11 illustrate general features of the invention. FIG. 1 shows graphically how an approximate near neighbor may be found. FIG. 2 shows a sequence of arrays of near neighbor data items produced to find approximate near neighbors. FIG. 3 shows general steps in finding approximate near neighbors. FIG. 4 shows a white pixel and several nearby black pixels within an image. FIG. 5 shows general steps in finding a pixel's approximate near neighbors in a set of zones of orientation. FIG. 6 shows an asymmetric arrangement of quadrants around a pixel. FIG. 7 shows general steps in producing near neighbor data items for asymmetric quadrants around a pixel. FIG. 8 shows a path from a pixel to another pixel of which it is an approximate near neighbor. FIG. 9 shows a set of bit vectors defining a path between the pixels in FIG. 8. FIG. 10 shows general steps in storing path data. FIG. 11 shows general steps in making a selected near neighbor pixel the current focus pixel.

FIG. 1 shows pixel 10, a white pixel that occurs in an image that also includes black pixels 12, 14, and 16, all of which are relatively near pixel 10. FIG. 1 also illustrates how one of pixels 12, 14, and 16 can be found to be an approximate near neighbor of pixel 10.

The lower left corner of pixel 10 is shown as the origin of x- and y-coordinates within the image. Pixel 10 can first be combined with pixel 20 to form a rectangular region. This rectangular region can then be combined with rectangular region 22, similarly formed by combining pixels, then with square region 24, then with rectangular region 26, and so forth, until pixels 12, 14, and 16 are found. As pixels are combined to form regions in this manner, data is produced indicating whether each region includes a pixel that meets a near neighbor criterion, such as being a black pixel.

When square region 24 is formed, its near neighbor data can indicate that it includes a near neighbor pixel, pixel 12. Its near neighbor data can also indicate the distance from the lower left corner of square region 24 such as by providing a pair of x- and y-offsets (0, +1). Then, when the square region that includes pixel 10 is combined with square region 24, the near neighbor data for the resulting rectangular region can indicate that it also includes a near neighbor pixel, and can indicate the distance with the pair of offsets (0, +3), produced by adding the offsets of square region 24 to the offsets from the lower left corner of pixel 10 to the lower left corner of square region 24, which are (0, +2).

Similarly, when rectangular region 26 is formed, its near neighbor data can indicate the presence of pixel 16 at offsets (+1, +1) from the lower left corner of region 26. Pixel 16 can be found to be the near neighbor by comparing its offsets (+1, +1) from the lower left hand corner of region 26 to the offsets (0, +2) of pixel 14, obtained like the offsets for pixel 12 as described above. Then, when rectangular region 26 is combined with the similar rectangular region that includes pixel 10, the near neighbor data for the resulting square region can indicate the presence of a pixel and the offsets (0, +3) to pixel 12, because it is nearer than pixel 16, which is at offsets (+3, +1).

Pixel 12 is called an approximate near neighbor because it may not be the near neighbor of pixel 10 according to some criteria. By some criteria, pixel 14 may be the near neighbor of pixel 10.

FIG. 2 shows a sequence of data arrays that can be produced to find pixel 12 as an approximate near neighbor of pixel 10 in FIG. 1. Each array includes a respective data item for each pixel, with the respective data items of pixels 10, 12, 14, and 16 at positions (0, 0), (0, 3), (2, 2), and (3, 1), respectively. The sequence begins with array 40, in which each pixel's respective data item includes a pixel value, "0" for a white pixel and "1" for a black pixel.

Each data item in array 42 is a starting near neighbor data item that indicates whether a region of single pixel size includes a near neighbor pixel and, if so, the offsets from the respective pixel to the near neighbor. Each data item in array 42 that indicates presence of a near neighbor pixel also includes x- and y-offsets of (0, 0).

Each data item in array 44 is produced by combining the respective data item in array 42 with the first data item above it. Each data item in array 44 therefore indicates the presence of a near neighbor pixel in a rectangular two pixel regions.

Each data item in array 46 is produced by combining the respective data item in array 44 with the first data item to its right. The pixel at (2, 1) in array 46 is produced by arbitrarily selecting between two equidistant near neighbor pixels, pixels 14 and 16.

Each data item in array 48 is produced by combining the respective data item in array 46 with the second data item above it. The data item at (2, 0) in array 48 is produced by selecting the nearer of two near neighbor pixels, pixels 14 and 16, based on the offsets in the data items at (2, 0) and (2, 2) in array 46. The offsets of pixel 14, (0, +2), are produced by adding the offsets on the data item at (2, 2) and the offsets from position (2, 0) to position (2, 2), which are (0, +2). The offsets of pixel 16, (+1, +1) are taken directly from the data item at position (2, 0) in array 46. The offsets can be compared by comparing the sum of their squares, with pixel 16 being a nearer neighbor according to this criteria.

Each data item in array 50 is produced by combining each data item in array 48 with the second data item to its right. The data item at position (0, 0) in array 50 is produced by selecting the nearer of two neighbor pixels, pixels 12 and 16, based on offsets of (0, +3) and (+3, +1) from array 48, produced as described above. Since pixel 12 is nearer according to the sum of squares criterion, it is selected as the near neighbor.

The arrays in FIG. 2 can be produced very quickly in parallel, with each processing unit performing a sequence of steps that produces all the data items for a respective pixel. The processing units can be interconnected so that each processing unit receives the results from other processing units as necessary.

FIG. 3 shows general steps in producing the sequence of FIG. 2. The step in box 60 stores pixel values for the pixels of an image in memory. The step in box 62 then produces a hierarchy of near neighbor data items by operating on the stored pixel values. Each pixel's near neighbor data item at each level indicates a near neighbor attribute for the pixel.

FIG. 4 shows a part of an image that includes white pixel 70 and nearby black pixels 72, 74, 76, 78, and 80. The technique illustrated in FIGS. 1 and 2 could be applied to determine that pixel 72 is an approximate near neighbor of pixel 70. But the technique of FIGS. 1 and 2 would not find pixels 74, 76, 78, and 80, all of which could be considered approximate near neighbors. Except for pixel 74, these other pixels are oriented such that they would not be in any of the regions formed by combining subregions as in FIG. 1.

FIG. 5 illustrates steps that would find more of the nearby pixels in FIG. 4. The step in box 90 stores the pixel values in memory. The step in box 92 then produces a set of near neighbor data items, each indicating a near neighbor attribute for a zone of orientation. Together, the zones of orientation can include all orientations with respect to a given pixel.

In FIG. 4, for example, if each zone of orientation is a quadrant, and if the near neighbor data item for each quadrant is produced by steps as in FIGS. 1 and 2, four approximate near neighbors can be found. Pixel 72 can be found in the first quadrant; pixel 74 in the second quadrant; pixel 78 in the third quadrant; and pixel 80 in the fourth quadrant. These four data items could then be combined into a single data item indicating the nearest of the approximate near neighbors, the offsets to all of the approximate near neighbors, or another appropriate near neighbor attribute.

FIG. 4 illustrates how the technique of FIG. 1 may produce problematic results. If pixel 72 were a white pixel, pixel 74 would be the approximate near neighbor both in the first and second quadrants. Or if pixel 70 were a black pixel, it would be the approximate near neighbor of itself in all four quadrants. These problematic results occur because a pixel and the rays of pixels that extend horizontally and vertically from it are included in more than one of the quadrants centered at the pixel.

FIG. 6 shows one way that asymmetric quadrants may be defined to avoid these problems. Pixel 100, with respect to which near neighbor pixels are being found, has neighboring pixels 102, 104, 106, and 108, which are positioned respectively at the origins of the first through fourth quadrants. Another arrangement could be made with pixel 104 at the origin of the first quadrant and so forth.

FIG. 7 shows general steps that could be used to produce near neighbor data items for pixel 100 in FIG. 6. The step in box 120 produces each pixel's near neighbor data item for each quadrant. For example, this step produces a near neighbor data item for pixel 102 in all four quadrants. Then the step in box 122 shifts near neighbor data items and adjusts them so that each pixel is labeled with near neighbor data items indicating the presence and offsets to near neighbor pixels in asymmetric quadrants defined as in FIG. 6. For example, the first quadrant near neighbor data item of pixel 102 can be shifted to pixel 100, and offsets in it can be adjusted by offsets of (+1, 0) from pixel 100 to pixel 102; similarly, the second quadrant data item of pixel 104 can be shifted to pixel 100, and adjusted by offsets of (0,+1); and so forth.

FIG. 8 shows a path from black pixel 130 in an image to another pixel of which pixel 130 is an approximate near neighbor. As shown, pixel 132 is the second pixel on the path, because pixels 130 and 132 are combined to form a rectangular region within which pixel 130 is the near neighbor pixel. The path stays in pixel 132 for another level because pixel 130 is also the near neighbor pixel when the rectangular region is combined with rectangular region 134 to form a square region. Then, the path goes to pixel 136, when the square region is combined with square region 138 to form a rectangular region. Finally, the path goes to pixel 140 when the rectangular region is combined with rectangular region 142 to form a square region.

In producing the hierarchy of data items to find approximate near neighbors, data about near neighbors is communicated along the path between pixel 130 and pixel 140, which can be called an "owner" that has pixel 130 as a near neighbor. The path between pixel 130 and pixel 140 can also be used for communication of data at other times, either from owner to neighbor or from neighbor to owner. Rather than repeating the operations to find near neighbors each time this path is used, data defining the path can be stored for subsequent use in following the path.

FIG. 9 shows four bit vectors that, together, define the path between pixel 130 and pixel 140. Bit vector 150, which could be stored in the local memory of a processing unit obtaining the near neighbor data items for pixel 130, includes all zeros, indicating that none of its approximate near neighbors are received from another processing unit, which is appropriate for a black pixel. Bit vector 152, for pixel 132, includes a "1" at the second level, indicating that it receives its approximate near neighbor at the second level from another processing unit, in this case the processing unit for pixel 130. Bit vector 154, for pixel 136, includes a "1" at the fourth level, because it receives its approximate near neighbor at the fourth level from the processing unit for pixel 132. Bit vector 156, for pixel 140, includes a "1" at the fifth level, because it receives its approximate near neighbor at the fifth level from the processing unit for pixel 136.

When bit vectors as shown in FIG. 9 have been stored at the processing units, data can be communicated in either direction on the path between pixel 130 and pixel 140 based on the bit vectors, as shown by arrows in FIG. 9. Since each near neighbor may have several owners, the bit vectors may be used to transmit data from a neighbor to all of its owners. After following the path to an owner as defined by the bit vectors, an additional one-pixel shift may be necessary to reach an additional owner due to the step in box 122 in FIG. 7. On the other hand, following the path from owner to neighbor may lead to collisions, because two owners may provide different data to the same neighbor. Also, before beginning the path to a neighbor as defined by the bit vectors, a one-pixel shift may be necessary to reach the owner at the beginning of the path due to the step in box 122 in FIG. 7.

FIG. 10 shows general steps in producing path data such as the bit vectors in FIG. 9. The step in box 160 stores the pixel values of an image in memory, and the step in box 162 finds approximate near neighbors, storing path data indicating a path between a pixel and its near neighbor pixel. The path data can indicate a path by indicating, for a first processing unit producing a near neighbor data item at a given level in a hierarchy, a second processing unit that produced the near neighbor data item at the next lower level that is used by the first processing unit to produce its near neighbor data item.

FIG. 11 shows general steps in shifting focus from a current focus pixel to one of its near neighbor pixels. The step in box 170 stores pixel values in memory, with data indicating which pixel is the current focus pixel. The step in box 172 then produces near neighbor attribute data for a set of near neighbors of the current focus, which can be the quadrant near neighbors as discussed in relation to FIGS. 4–7. The step in box 172 also produces path data indicating, for each near neighbor, a path from the current focus pixel to the near neighbor, which can be produced as described in relation to FIGS. 8–10. The step in box 174 selects one of the near neighbors to be the new current focus pixel by operating on the near neighbor attribute data. The step in box 176 then changes the data indicating current focus to make the selected near neighbor the current focus pixel.

C. An Implementation

Some features of the invention have been implemented on a Connection Machine from Thinking Machines Corporation, using the in-place implementation techniques described in the architecture application to produce exhaustive hierarchies of data items. The implementation includes underlying image linking operations and higher level applications that operate on data produced by the linking operations.

Figure 19:
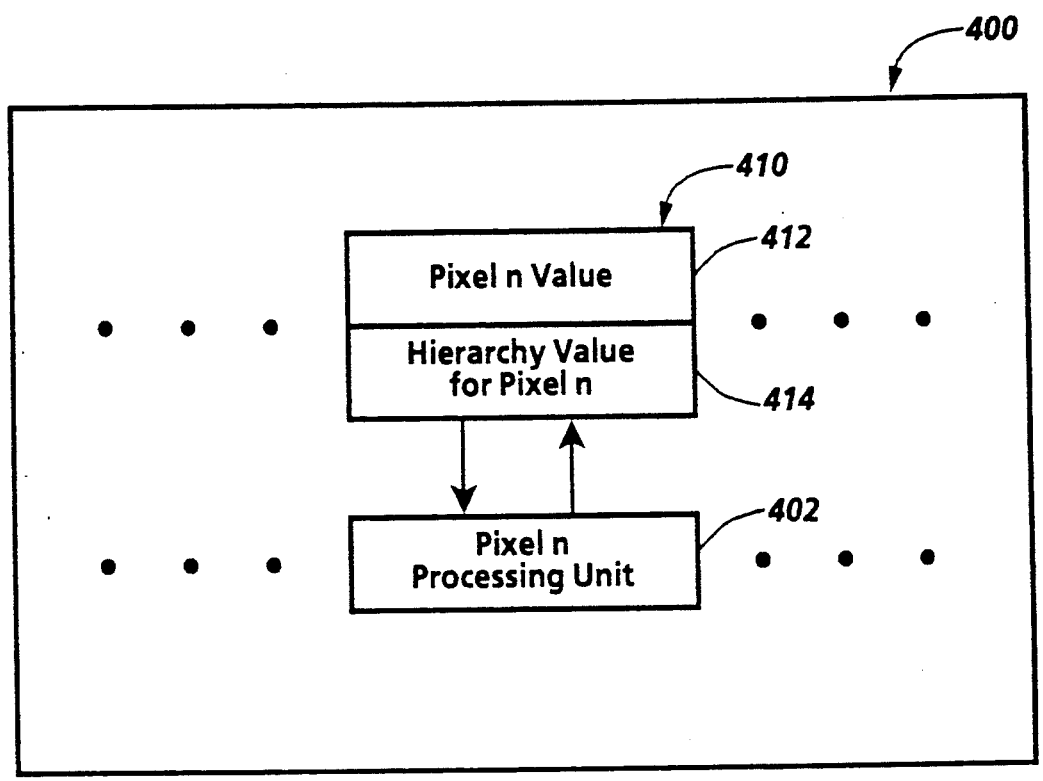
FIG. 19 illustrates features of processor 400, a connection machine.

FIG. 19 illustrates features of processor 400, a Connection Machine. Processor 400 includes a plurality of processing units, one for each pixel of an image. Each pixel's processing unit has local memory, as illustrated by processing unit 402 with local memory 410. Processing unit 402 is the processing unit for pixel n, so that local memory 410 stores pixel n's value 412 and also stores hierarchy values 414. Hierarchy values 414 are pixel n's values in a hierarchy of data items produced by operating processor 400.

1. Image Linking

Figure 12:
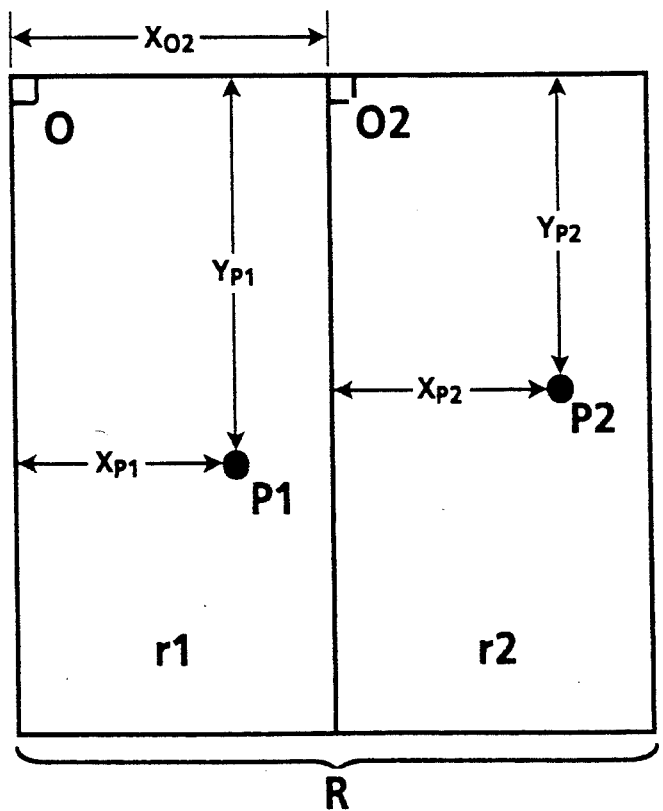
FIG. 12 is a schematic diagram of an arrangement of pixels showing how rectangular regions are combined into a square region in finding near neighbors.
Figure 13:
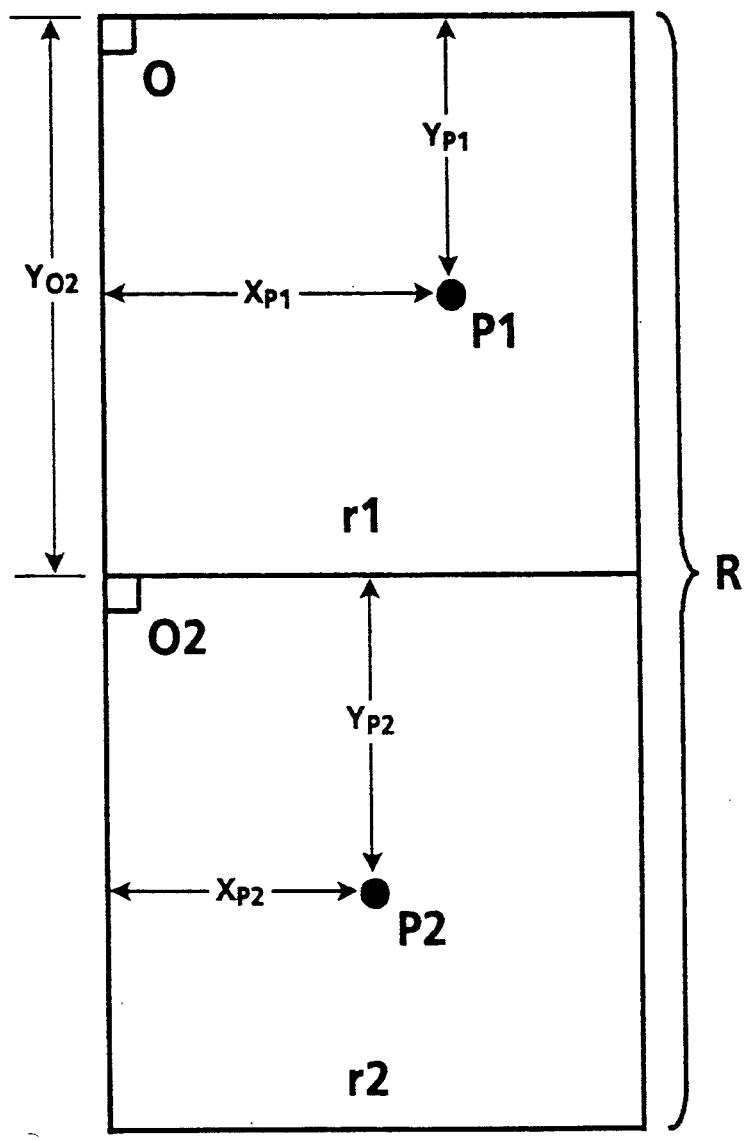
FIG. 13 is a schematic diagram of an arrangement of pixels showing how square regions are combined into a rectangular region in finding near neighbors.

The Connection Machine implementation uses a local hierarchical process to find, in parallel for every pixel in an image, the near neighboring black pixels in each quadrant. FIGS. 12 and 13 show designations of regions, pixels, and offsets in the fourth quadrant, but the same designations can be used in any of the four quadrants. The pixel for which a near neighbor is being sought is O, at the upper left corner of subregion r1 of region R. Subregion r2 of region R, shaped the same as r1, has pixel O2 in its upper left corner, offset by $x_{O2}, y_{O2}$ from O. Subregion r1 may contain one or more black pixels; if it does, the black pixel nearest to O, pixel p1, is at offsets $x_{p1}, y_{p1}$ from O. Subregion r2 may similarly contain one or more black pixels; if it does, the black pixel nearest to O2, pixel p2, is at offsets $x_{p2}, y_{p2}$ from O2 and at offsets $x_{O2}+x_{p2}, y_{O2}+y_{p2}$ from O.

The signs of $x_{O2}$ and $y_{O2}$ determine quadrant. For the first quadrant, the origin is the lower-left corner of the region. For the second quadrant, the origin is the lower-right corner of the region. For the third quadrant, the origin is the upper-right corner of the region.

Figure 14:
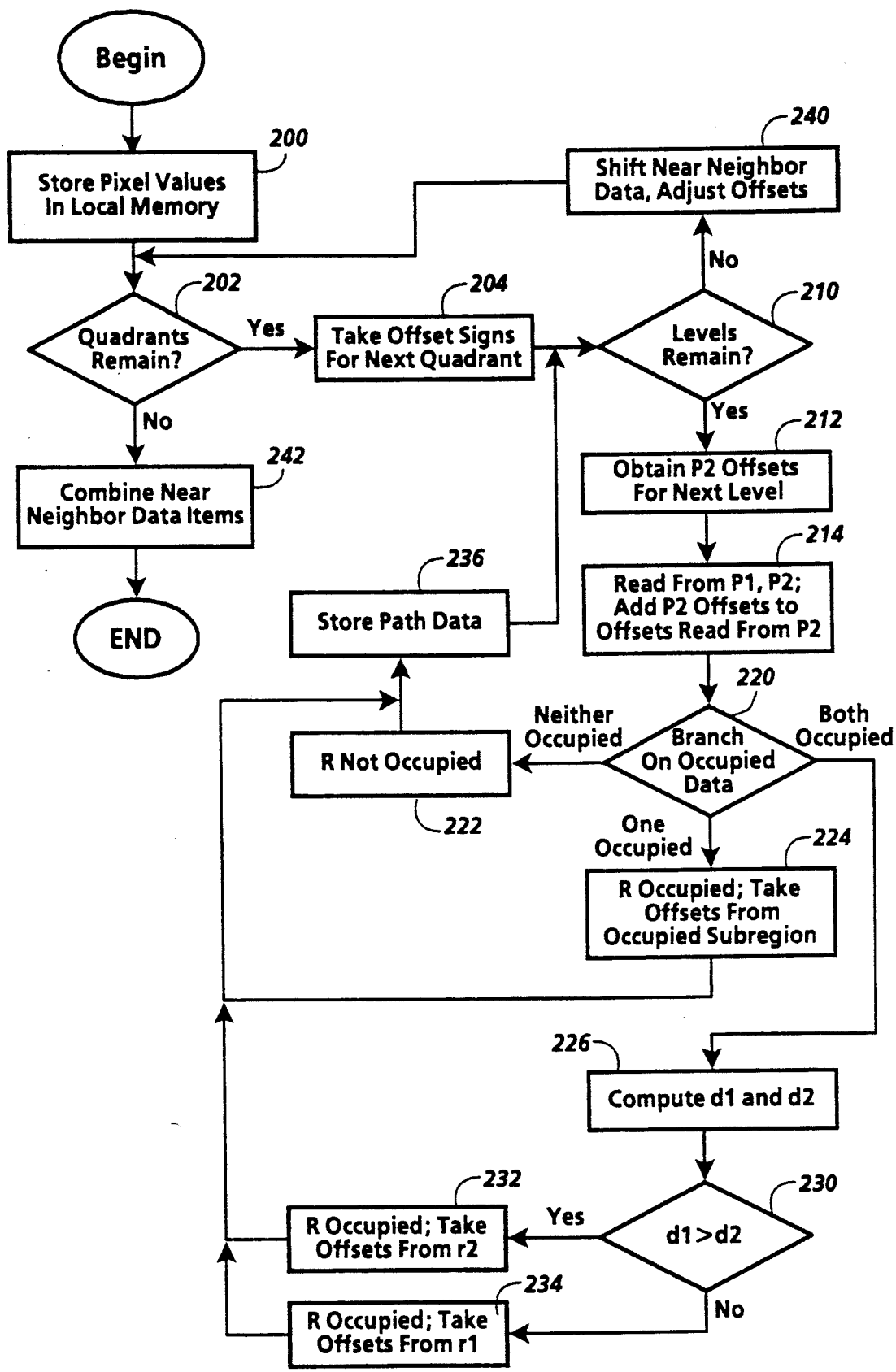
FIG. 14 is a flow chart showing steps in finding near neighbors for each quadrant.

FIG. 14 shows steps followed in finding approximate near neighbor pixels in all four quadrants for a square image of width N. These steps produce an exhaustive hierarchy of near neighbor data items for each quadrant, using an in-place implementation in which each processing unit produces all the near neighbor data items for a respective pixel. The hierarchy includes $h+1$ levels, where $h=2 \log N$. The regions on level $l=0$ are one pixel in size, while the regions on level $l=h$ are as large as the entire image.

The processor P producing the near neighbor data item for a region R operates on the results produced by processors P1 and P2 for subregions r1 and r2, respectively. Uniform communication between processors is implemented by shifting the array. The offsets of P1 and P2 are (0, 0), so that P1 is P and communication between P1 and P is done by transferring values between different memory locations in the same processor. The absolute values of the offsets of P2 from P, $(x_{O2}, y_{O2})$, are $(2^{(l-1)/2}, 0)$ at odd levels and $(0, 2^{(l/2)-1})$ at even levels. The signs of these offsets depend on the quadrant of interest: the x offset is positive in the first and fourth quadrants and negative otherwise; the y offset is positive in the first and second quadrants and negative otherwise.

FIG. 14 shows steps performed in producing near neighbor data for each quadrant. The step in box 200 stores pixel values in the local memories of the processing units such that each processing unit can access the respective pixel's pixel value. The test in box 202 begins an iterative loop that produces the near neighbor data for each quadrant. The step in box 204 takes the signs for the offsets to be used in the next quadrant. The test in box 210 begins an iterative loop that produces the near neighbor data items for each level in the hierarchy. The step in box 212 obtains the offsets from P to P2 for the next level.

The steps in box 214 and the following boxes are performed in parallel by the processing units. In box 214, each processing unit P reads the near neighbor data from P1, which is the same as P, and P2. Each processing unit adds the offsets to P2 from box 212 to the offsets in the near neighbor data from P2, to obtain offsets from P. Each processing unit then branches based on whether r1 and r2 are occupied, as indicated by the respective near neighbor data items. If neither is occupied, the step in box 222 produces a near neighbor data item that indicates that R is not occupied. If one is occupied, the step in box 224 produces a near neighbor data item that indicates that R is occupied and that includes the offsets from P to the near neighbor pixel in the occupied subregion. If both are occupied, the step in box 226 computes the distances d1 to p1 in r1 and d2 to p2 in r2, by operating on the offsets from box 214. These distances can be calculated using the following equations: $d1^2 = x_{p1}^2 + y_{p1}^2$ and $d2^2 = (x_{O2}+x_{p2})^2 + (y_{O2}+y_{p2})^2$. The step in box 230 then branches based on whether d1 is greater than d2. If so, the step in box 232 produces a near neighbor data item indicating that R is occupied and including the offsets from P to p2 in r2. If not, the step in box 234 produces a near neighbor data item indicating that R is occupied and including the offsets from P to p1 in r1.

When the near neighbor data item has been produced, the step in box 236 stores path data. This data can be stored in a data structure that, for a given quadrant, explicitly stores the hierarchical paths from neighbor locations to their owners. If the paths between neighbors and owners are heavily used, the stored hierarchical paths mean that the offsets need be computed only once. There is one path from a neighbor to each of its owners. The complete set of paths from neighbors to owners, for one quadrant, may be represented by a single bit in each processing unit at each level of the hierarchy—a bit vector of length h in each processing unit, altogether. If a processing unit P is on some path, then the bit at a given level in the hierarchy defines which of that processing unit's children P1 and P2 is also on the path. In other words, it defines which subregion contains the nearest neighbor. Storage in this data structure—termed the link bit vector—is heavily shared across different links.

The step in box 236 can generate the link bit vector for each processing unit for each quadrant. Each processing unit's local memory holds an additional variable L, a bit vector to store the links, indexable by level in the hierarchy. A "0" in a given bit of L indicates that the neighbor, if any, is included in r1. A "1" in a given bit of L indicates that the neighbor, if any, is included in r2. In addition, as discussed below, it may be convenient to insert "0" in a given bit of L if there is no neighbor at the respective level. The step in box 236 stores the appropriate value into bit l of L.

When all of the levels of the hierarchy have been produced, each processing unit's near neighbor data item includes offsets to the nearest black pixel in the specified quadrant, inclusive of the black pixel at the location of that processing unit, if any. In other words, the x and y offsets are both zero at a black pixel. A useful way of viewing this problem is that the algorithm gives inclusive results because it employs a discrete definition of the quadrants in which the quadrants include the origin location O. As discussed in relation to FIG. 6, a simple, elegant way of getting exclusive results—that preserves the simple form of the algorithm without requiring special-case computations for gaps between quadrants—is to define the quadrants asymmetrically so as not to include the origin location.

To obtain an exclusive result at each location, the step in box 240 shifts near neighbor data items and adjusts offsets. The offsets of the adjacent pixels form which a pixel receives shifted neighbor offsets are $(+1, 0)$ for the first quadrant, $(0, -1)$ for the second quadrant, $(-1, 0)$ for the third quadrant, and $(0, +1)$ for the fourth quadrant. The step in box 240 can thus be implemented as follows: For each pixel p, let the adjacent pixel in the specified quadrant be q. If q is a white pixel, then the offsets of q from p are added to the neighbor offsets stored at q to get the neighbor offsets for p. If q is a black pixel, then the offsets of q from p are the new neighbor offsets for p—that is, q is itself p's nearest neighbor in the quadrant in question. Note that p may be black or white. This step modifies neighbor offsets at all pixels, making them consistent with a discrete definition of the quadrants.

When near neighbor data for all quadrants have been produced, the optional step in box 242 combines the near neighbor data items. For example, it may be desirable to reduce the memory required to store the near neighbor data items, such as by saving only the nearest of the near neighbors or by encoding the near neighbor data items in a more compact form.

Figure 15:
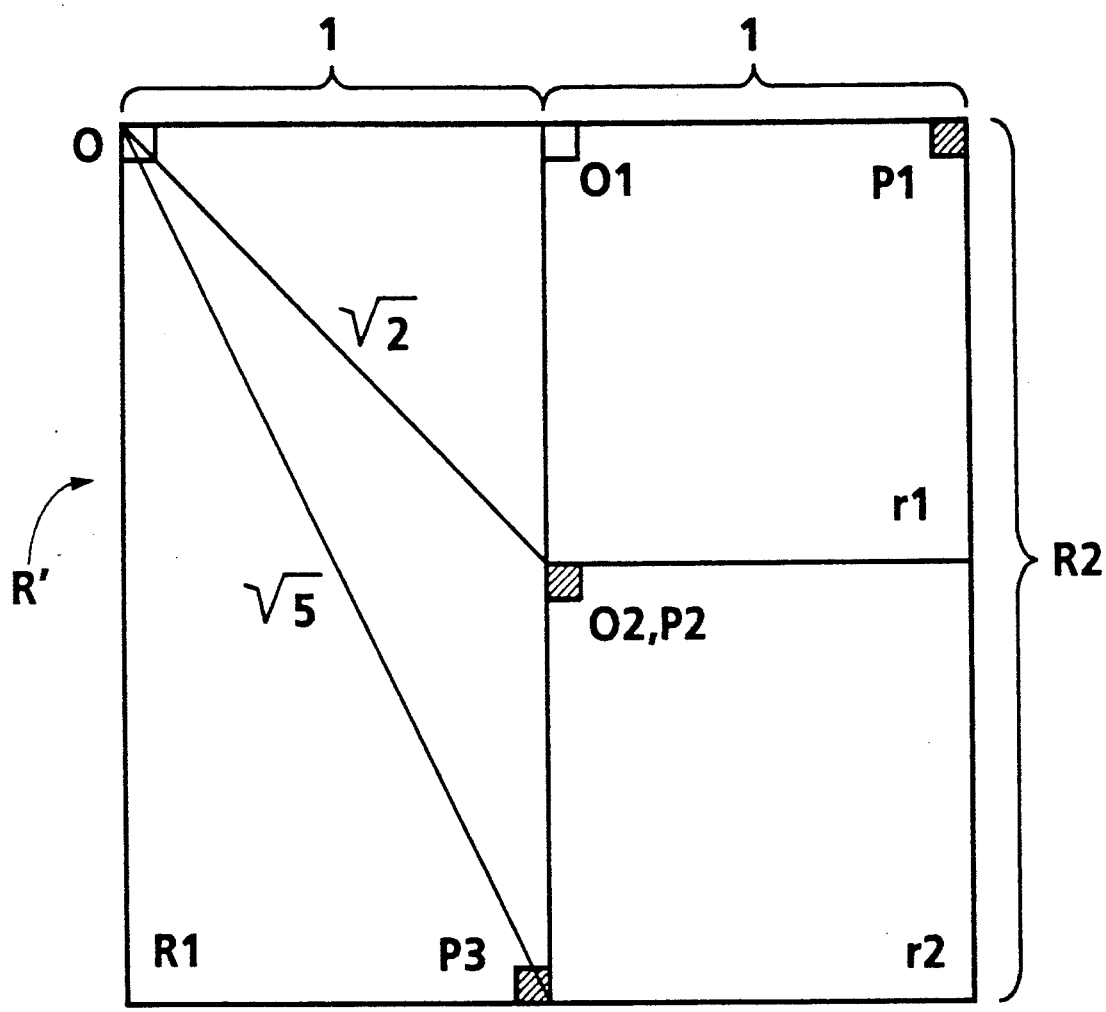
FIG. 15 is a schematic diagram of an arrangement of pixels illustrating approximate near neighbors.

If the steps in FIG. 14 apply the Manhattan (or city block) distance metric, the operation finds the Manhattan nearest neighbor. Using Euclidean distance metric, however, it does not necessarily give the Euclidean nearest neighbor. This is illustrated in FIG. 15, which shows the worst case error for two steps of the computation, with parts labeled similarly to FIGS. 12 and 13. The largest square R', with origin O with respect to the fourth quadrant, is divided into two rectangular subregions R1 and R2. The subregion on the right, R2, is itself divided into two square subregions r1 and r2, whose origins are O1 and O2, respectively.

In the first step, p1 is correctly determined to be nearer to O1 than p2, based on the previously known offsets of p2 from O2. In the second step, p1 is correctly determined to be closer to O than p3, and therefore is determined to be the nearest black pixel in R to O, which is incorrect in terms of the Euclidean distance metric since p2 is actually nearer to O than either p1 or p3. As shown, the approximate near neighbor found by the steps in FIG. 14 can be farther away than the Euclidean nearest neighbor by as much as a factor of $\sqrt{2}$. In practice, the steps in FIG. 14 typically find the Euclidean nearest neighbor, because the error zone—in which the true nearest neighbor is "hidden" by some other black pixel—is a relatively small portion of the region R, making the error situation rather uncommon. Thus, the near neighbors found by the steps in FIG. 14 are useful approximations to the Euclidean nearest neighbors.

2. Data Communication

While finding near neighbors in a given quadrant, the steps in FIG. 14 can also be used to communicate data from the neighbor locations (such as the values of local geometric properties stored in other arrays) to the locations of which they are neighbors, called the owners. For example, the local value of a geometric property could be communicated from each neighbor to its owners. To implement this, each processing unit's local memory can contain an additional variable v for holding data being transmitted. At the beginning of the iterative loop for each quadrant, as part of the step in box 204, v can be initialized to the appropriate value at each pixel, to be transmitted to the owners of that pixel. After each level of the hierarchy is produced, if the neighbor of O in R is found to be in r1, the contents of v in P1 are read and stored into v in P as part of the step in box 224 or as part of the step in box 234; if the neighbor of O is found to be in r2, the contents of v in P2 are read and stored into v in P as part of the step in box 224 or as part of the step in box 232.

Figure 16:
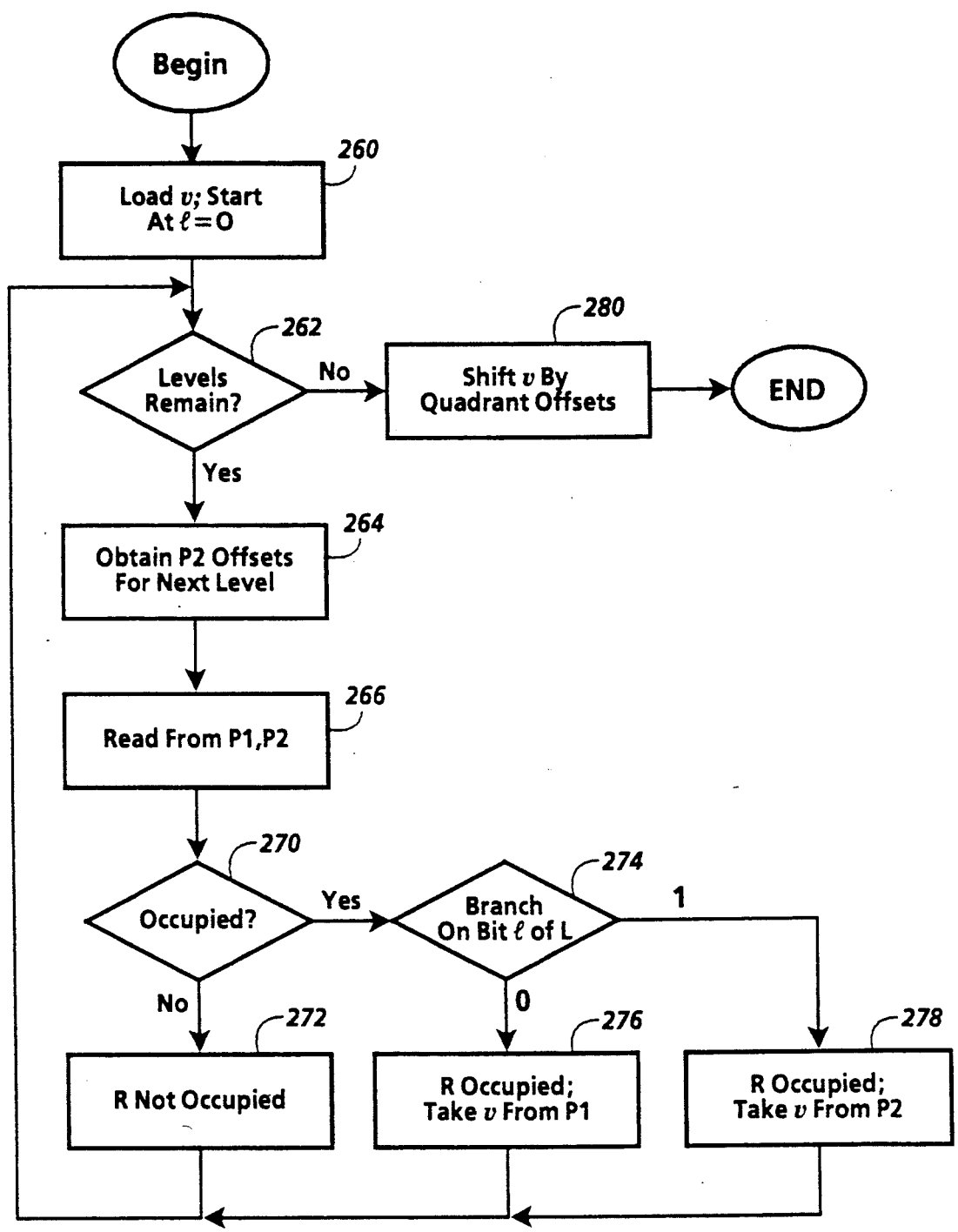
FIG. 16 is a flow chart showing steps in transmitting data from neighbors to owners using stored path data.
Figure 17:
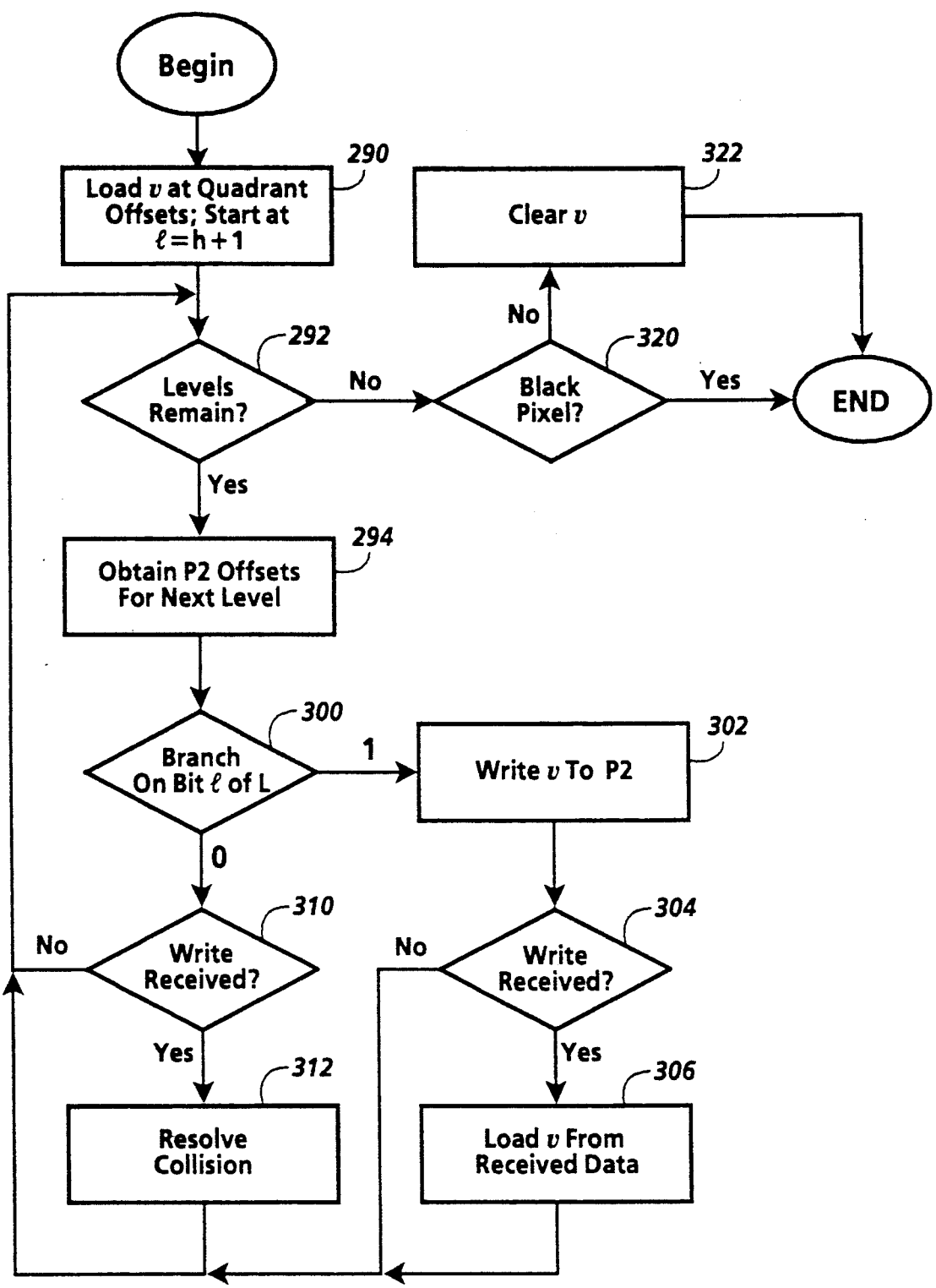
FIG. 17 is a flow chart showing steps in transmitting data from owners to neighbors using stored path data.

Once a bit vector for a given quadrant has been stored in the local memory of each processing unit, as described above in relation to box 236, data can be communicated from neighbor to owner or from owner to neighbor within the quadrant using the bit vector. FIG. 16 shows steps in communicating data from neighbor to owner and FIG. 17 shows steps in communicating data from owner to neighbor.

In FIG. 16, the step in box 260 begins by loading the data to be transmitted into v in the local memory of each processing unit and by initializing l to zero. The step in box 262 begins an iterative loop that is performed for each level of the hierarchy above the lowest level.

The first step in the iterative loop, in box 264, obtains the offsets to P2 from each processing unit on the next level l upward in the hierarchy. The step in box 266 then reads from P1 and P2 using the offsets obtained in box 264, to obtain v and also data indicating whether r1 and r2 are occupied. The step in box 270 branches based on whether r1 and r2 are occupied—at the lowest level, a black pixel is occupied and a white pixel is not. If neither is occupied, the step in box 272 stores data indicating that R is not occupied. If one or both are occupied, the step in box 274 branches on bit l of bit vector L. If bit l is a "0", data is stored to indicate that R is occupied and v is kept at its value for r1 from P1. If bit l is "1", data is stored to indicate that R is occupied and v is changed to the value for r2 from P2.

When all the levels have been handled, the step in box 280 shifts v by the offsets for the quadrant. This step is similar to box 240 in FIG. 14, except that no offset adjustment is necessary.

In FIG. 17, the step in box 290 begins by loading the data to be transmitted into v in the local memory of each processing unit, taking into account the offsets for the quadrant, and by initializing l to h+1. The step in box 292 begins an iterative loop that is performed for each level of the hierarchy down to l=1.

The first step in the iterative loop, in box 294, obtains the offsets to P2 from each processing unit on the next level l downward in the hierarchy. The step in box 300 branches based on bit l of bit vector L.

If bit l is a "1", the step in box 302 writes v to P2, using the offsets obtained in box 294. Then, the step in box 304 tests whether a write has been received from another processing unit performing the step in box 302. If so, the step in box 306 loads v based on the received data before returning to the step in box 292.

If bit l is a "0", the step in box 310 tests whether a write has been received from another processing unit performing the step in box 302. If so, the step in box 312 resolves the collision before returning to the step in box 292. Collisions can occur in writing from owners to neighbors because each black pixel may be defined by the linking algorithm to be the neighbor of more than one owner pixel for a particular quadrant; typically, a black pixel will have many owners. A collision occurs whenever two owners write data to the same neighbor or to a shared processing unit on the paths to a shared neighbor. The standard methods for dealing with collisions in parallel computations—such as accepting only the first value to arrive, allowing later arrivals to overwrite previous values, or combining all colliding values with functions such as the maximum or minimum—could be used here.

In addition to resolving collisions, it may be necessary for the step in box 312 to check whether a collision has actually occurred. If a "0" is loaded into L at each level at which R is not occupied, as noted above in relation to box 236 in FIG. 14, the step in box 312 is only reached when R is occupied, which avoids spurious collisions, and no collisions will occur when bit l of L is a "1", as implicitly assumed in FIG. 17. Collisions can also be avoided by writing from only one owner to its neighbor, in which case the data being written can include a code to indicate to the step in box 312 which data to save in case of collision.

3. Shifting Focus Pixel

The term "processing focus" refers to a special location in an image at which image analysis operations may be selectively applied. For example, in an image that includes a number of dots, the dots can be counted by a simple routine as follows: While unseen dots remain, (i) shift the processing focus to an unseen dot; (ii) mark this dot seen and add 1 to the count; (iii) repeat. More generally, tasks involving visual search or scanning imply the use of a processing focus.

As can be seen from the brief discussion in relation to FIG. 11, above, an operation shifting processing focus includes two general stages. The first stage selects a pixel to be the new focus. The second stage executes the shift.

In the first stage, the ability to establish near-neighbor relations in the image, and to communicate information between near neighbors, provides a number of possible criteria for choosing the target of a processing shift, including proximity, direction, and similarity. The proximity criterion selects the nearest neighbor of the current processing focus. The direction criterion selects the neighbor whose relative orientation is closest to a given direction. The similarity criterion selects the neighbor whose value of a given property is closest to the value at the current processing focus. These criteria could be applied conditionally to just those neighbors that have been preselected, for example by some prior grouping operation.

In the second stage, a simple in-place hierarchical process can shift the focus to the selected neighbor in one downward pass. The steps in FIG. 18, after selecting a near neighbor, perform such a process in a manner resembling the steps in FIG. 17. The process descends the hierarchy, shifting the focus at each level to the appropriate corner of the subregion of the current region that is specified in the link bit vector L of the quadrant of the selected neighbor. The processing focus is represented by a single bit called Focus in the local memory of each processing unit. Each processing unit also has a field called Temp for temporary storage.

Figure 18:
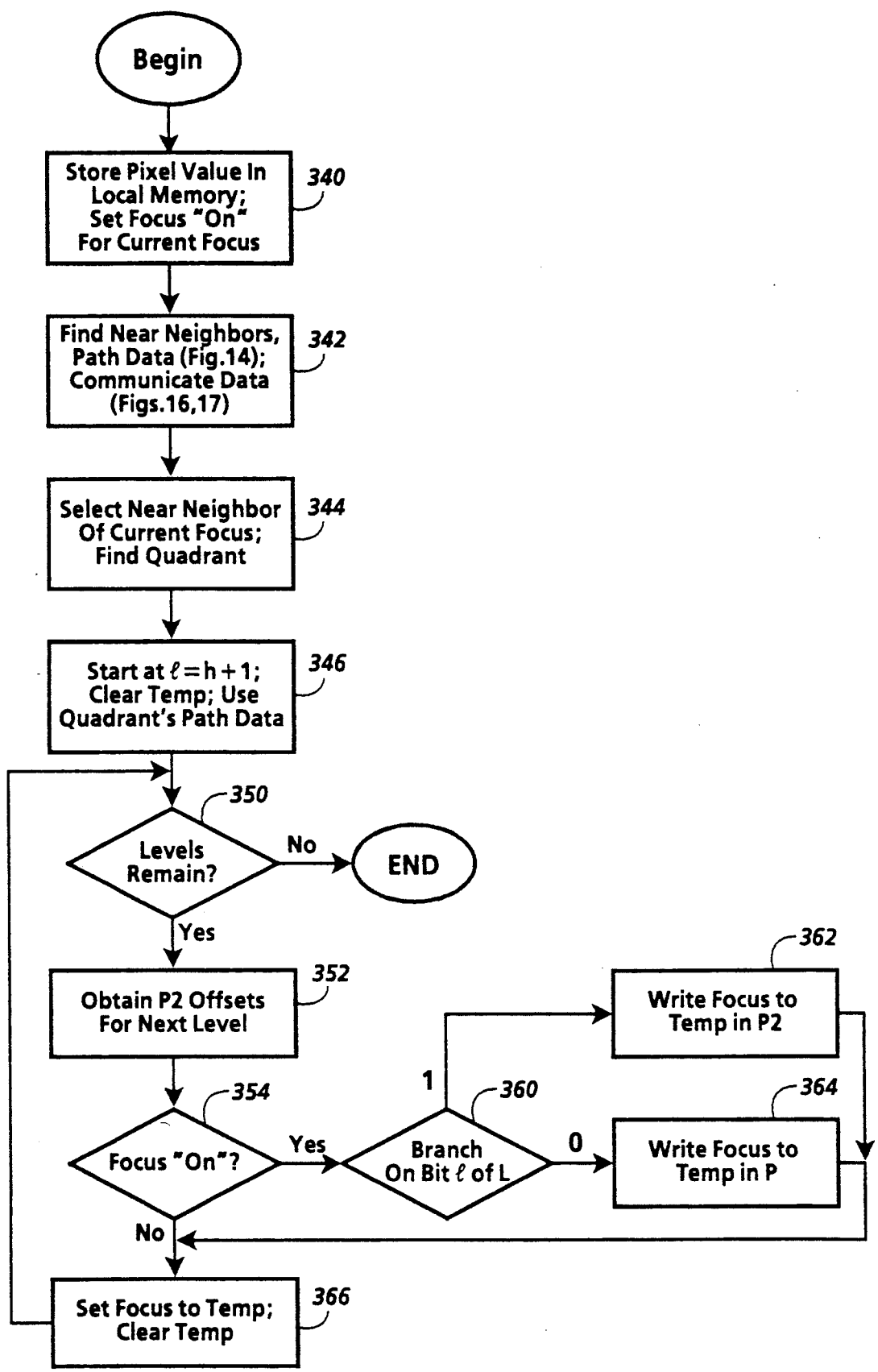
FIG. 18 is a flow chart showing steps in shifting focus using stored path data.

In FIG. 18, the step in box 340 stores the image's pixel values with each processing unit's local memory including the respective pixel's value. Also, the step in box 340 performs operations that result in Focus being set to its "on" value for a current focus pixel, which could include operations on the stored pixel values. The step in box 342 finds near neighbors and path data, following the steps in FIG. 14, and may also perform operations communicating data to and from the near neighbors, following the steps in FIGS. 16 and 17. The step in box 344 selects one of the near neighbor pixels of the current focus pixel and finds its quadrant. Then, the step in box 346 prepares for the downward pass by setting l to h+1, by clearing Temp, and by setting data so that the downward pass will be performed using the path data from the step in box 342 for the selected neighbor's quadrant.

The step in box 350 begins an iterative loop that is performed on each level of the hierarchy down to l=1, the level above the pixel level. The step in box 352 begins the iterative loop by obtaining the offsets to P2 from each processing unit on the next level l downward in the hierarchy. The step in box 354, beginning a sequence of steps that are performed in parallel by the processing units, branches based on the value in the processing unit's Focus bit. If Focus has its "on" value, the step in box 360 branches based on the value in bit 1 of the processing unit's bit vector L.

If bit l is a "1," the step in box 362 writes the value in the processing unit's Focus bit, which is "on," to the Temp field in P2, using the offsets obtained in box 352. If bit l is a "0," the step in box 364 writes the value in the processing unit's Focus bit, which is "on," to the processing unit's own Temp field. Then, the step in box 366 sets the Focus bit of each processing unit to the value in its Temp field, before returning to the step in box 350. When all the levels have been handled in this manner, the processing unit of the neighbor selected in box 344 has its Focus bit "on" and all the other processing units have their Focus bits "off."

4. Further Applications of Near Neighbor Data

A number of other applications using near neighbor data are described in copending coassigned U.S. patent applications Ser. Nos. 07/535,089, entitled "Labeling Pixels of an Image Based on Near Neighbor Attributes" and Ser. No. 07/535,091, entitled "Comparison of Image Shapes based on Near Neighbor Data", both of which are incorporated herein by reference.

The technique of shifting processing focus can be used in higher level applications for such operations as counting dots by a shift and mark operation. In general, tasks involving visual search or scanning use a processing focus.

Image linking can support geometric reasoning in both direct and indirect ways. Image linking is indirectly involved whenever spatial analysis operations such as grouping, processing shifts, symmetry detection, component labeling, and so on are applied to geometric reasoning, perhaps in combination with other operations. Local symmetry representations, for example, can play a role in a wide range of visual discriminations, including establishing convexity (indicated by exterior symmetry points), part decomposition, shape properties such as taper, bending, and skew of a figure. Image links can be applied directly to geometric reasoning in several ways.

Simple spatial relations between scene items can be established by creating image links for some subset of the figures in the scene, and then examining the resulting links at certain figures. For example, a figure closest to a long curve in an image may be found by the following three-stage process. First, the long curve is copied to a separate binary array by a selection and coloring process. Second, links are computed for the array. Finally, each figure in the input is examined in turn to see how far from the curve it is.

Assuming, for simplicity, that the figures are small compared to the differences in their distance from the curve, it suffices to examine the links at any single pixel of each figure. Computing the links for an array containing only the curve avoids shadowing-it assures that the curve will be a neighbor of any pixel of every figure.

Other problems may involve slightly more sophisticated analysis of the neighbor relations at each location examined. For example, to find which of several figures an arrow points to, the figure singled out in the first step of the above procedure is the arrow. Or to determine whether a figure is within a polygon defined by a number of dots, the figures singled out in the first step of the above procedure are the dots.

It is also possible to establish whether one figure a is above another b by examining the neighbor relations holding between individual pixels of a and b: a may be defined to be above b if for some pixel p in a there is no pixel in b above p. Thus, the above relation can be established by looking at individual pixels in parallel, assuming a rich, relevant account of neighbor relations is available at each pixel. It turns out that a great deal of scene analysis can be carried out based on such peephole geometry.

Image links are a missing link between traditional pointwise low-level visual representation—such as edge and texture images—and the high-level representation of spatial relations among scene objects. They provide the representational power needed to support processes for controlling visual attention, separating figure from ground, and analyzing shape properties and spatial relations, and yet can be computed in fixed time even on simple, local parallel machines. Image links offer a unifying account for a wide range of visual phenomena—including Gestalt grouping, local symmetry detection, component labeling, visual search and scanning, and geometric reasoning.

The representational power of image links is that they provide a useful peephole view of the neighbor relations among objects in a scene. This power relies on the fact that they are defined across unlimited distances and in multiple directions at each and every pixel. The linking technique presented above does not suffer from near-sightedness or blind-spots, delivers results at each and every pixel, and can do all this in fixed time, for a given image size, on simple local computing machinery.

In the framework of image links, schemes for grouping, summarization, visual indexing, and so on, could be formulated as operations directly on iconic (or image-like) representations. A local account of visual representation for scene analysis may eventually lead to a perspective in which higher-level vision, abstract spatial reasoning, and behaviors guided by vision are also understood as intrinsically spatial computations grounded directly in image-like representations.

Image linking computations can be adapted to non-rectangular image tessellations, such as triangular and hexagonal tessellations. These alternative tessellations result in a different number of sectors at each point. Also, each gives rise to different error regions and maximum error.

The quadrant linking scheme could be applied to an image at several different orientations independently and the results somehow combined. This is an indirect way of establishing near neighbors in sectors of arbitrary size through the use of a mechanism involving fixed-size sectors such as the quadrants. Applying the quadrant-neighbor scheme at $\theta°$ intervals gives rise to an implicit sector size of $\theta$.

It may be possible to modify the quadrant linking scheme to give a better approximation to the Euclidean nearest neighbor in each quadrant.

Image linking computations as described above rely heavily on parallel computation for efficiency. There are efficient serial implementations for computing the Voronoi dual and various distance transforms. Thus on serial machines, efficient extensions of these serial methods that provide directional, positionally exhaustive results would be useful. Furthermore, it may be feasible to extend the techniques described above to a serial implementation, such as by using a very fast BitBlt operation.

D. Source Code Appendix

Appendix A is source code for implementing some of the features described above. The source code in Appendix A may differ in some respects from the above description, but execution of the source code in Appendix A on a Connection Machine provides substantially all the features described above. In some cases, the code has been optimized or includes additional features. Source code for implementing other features is included in copending coassigned U.S. patent application Ser. No. 07/535,213, entitled "Hierarchical Operations on Border Attribute Data for Image Regions" and Ser. No. 07/535,796, entitled "Dense Aggregative Hierarchical Techniques for Data Analysis," both of which are incorporated herein by reference in their entirety.

The following are included in Appendix A:

The function FLOAT-PROXIMITY-IS, of which the function FLOAT-PROXIMITY is an optimized version, performs the basic linking functions of finding near neighbor pixels, obtaining near neighbor link data, and storing path data.

The function ADJUST-OFFSETS shifts and adjusts near neighbor offsets for asymmetric quadrants.

The function READ-LINK propagates data from a near neighbor to its owners.

The function SHIFT-TO-NEIGHBOR-DIRECT shifts processing focus by following the path from an owner to its near neighbor.

E. Miscellaneous

The invention has been described in terms of operations on binary images, but could be applied to images of all types and, more generally, to bodies of data that map into arrays similar to those described.

An implementation of the invention has been described that employs in-place computation as described in the architecture application. The invention could also be implemented with the Binary Image Jungle (BIJ) described in the architecture application, if connections were provided for communicating directly across x and y offsets in both positive and negative directions. A simple way of supporting the full linking computation on a BIJ is to give each parent node at level 1 an additional child with offsets $(2^{(l-1)/2}, 0)$ at odd levels and $(0, 2^{(l/2)-1})$ at even levels. In other words, the number of connections at each processor could be increased from two to three.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

© 1990 Xerox Corporation. All rights reserved.

;;;-*- Syntax: Common-lisp; mode: lisp; package: REVERSE-GRAPHICS; base: 10-*-

```
;;;
;;; This file contains linking and communication operations.
;;;

;; For all operations in this file, the argument bitmap is a 1-bit
;; field pvar.

;; The operations in this file are in-place implementations of the
;; linking-related processes. In some cases, the independent-storage
;; version have been retained, and are named with the suffix -IS.

;;;----------------------------------------------------------------
;;; Storage allocation and top-level linking interface.

;; This structure is used in the RG system to contain the links and
;; their properties (corresponding offsets, distance, and orientation.)

;; path, xoff, yoff, dist, and angl are lists of pvars
(defstruct (link) path xoff yoff dist angl)

(defmacro LET-LINKS ((links) &body body)
  `(*let-fields .l 4 (1+ top-chunking-level)
    (*let-fields .x 4 (log analyze-dim 2)
     (*let-fields .y 4 (log analyze-dim 2)
      (*let-fields .d 4 (* (log analyze-dim 2) 2)
       (*let-fields .a 4 9
        (let ((,links (make-link :path .l :xoff .x :yoff .y :dist .d :angl .a)))
          (declare (special ,links))
          ,@body))))))

(defun ALLOCATE-LINKS ()
  (make-link :path (*allocate-fields 'path 4 (1+ top-chunking-level))
        :xoff (*allocate-fields 'xoff 4 (log2 analyze-dim))
        :yoff (*allocate-fields 'yoff 4 (log2 analyze-dim))
        :dist (*allocate-fields 'dist 4 (* (log2 analyze-dim) 2))
        :angl (*allocate-fields 'angl 4 9)))

(defun DEALLOCATE-LINKS (links)
  (loop for pvar in (append (link-path links)
              (link-xoff links) (link-yoff links)
              (link-dist links) (link-angl links))
     do (*deallocate pvar)))

;; This is the top-level function for creating links. The argument
;; LINKS is a link data structure as defined above. Its initial
;; contents do not matter---it is completely overwritten.

(defun LINK-CREATE
       (bitmap links &optional (level top-linking-level))
  (setq top-linking-level level)
  (let ((link-pvars (link-path links))
        (xoff-pvars (link-xoff links))
```

```
      (yoff-pvars (link-yoff links))
      (dist-pvars (link-dist links))
      (angl-pvars (link-angl links)))
  (noting-progress ("Linking")
    (loop-lists-in-tandem
      ((xoff-pvar yoff-pvar dist-pvar link-pvar angl-pvar)
       (xoff-pvars yoff-pvars dist-pvars link-pvars angl-pvars)
       :index quad :start 1)
      (note-progress quad 4)
      (float-proximity bitmap link-pvar dist-pvar xoff-pvar yoff-pvar quad)
      (adjust-offsets bitmap xoff-pvar yoff-pvar dist-pvar quad)
      (neighbor-orientation xoff-pvar yoff-pvar dist-pvar angl-pvar quad)))))
```

```
;;;----------------------------------------------------------------
;;; The linking workhorse
;;;
;;;

;; link contains 0 at a node if child 1 is on the path to the neighbor.
;; link contains 1 at a node if child 2 is on the path to the neighbor.

(defmacro offset-dist-squared!! (xoff yoff)
  `(+!! (*!! ,xoff ,xoff) (*!! ,yoff ,yoff)))

;; The function directly implements the basic linking process for a
;; given quadrant. It simultaneously
;; computes the link-bit-vector. It works both
;; in-place and with independent storage, assuming QCHILD-REF!! is
;; appropriately defined.

(*defun FLOAT-PROXIMITY-IS
    (bitmap link-pvar dist-pvar xoff-pvar yoff-pvar q)
  (declare (type (field-pvar 1) bitmap)
           (type (field-pvar (pvar-length link-pvar)) link-pvar)
           (type (field-pvar (pvar-length dist-pvar)) dist-pvar)
           (type (field-pvar (pvar-length xoff-pvar)) xoff-pvar yoff-pvar))
  (*let ((occupied bitmap))
    (declare (type (field-pvar 1) occupied))
    (*set link-pvar (!! 0) dist-pvar (!! 0) xoff-pvar (!! 0) yoff-pvar (!! 0))
    (loop for l from 1 to top-linking-level do
      (*let (c1occupied c2occupied temp)
        (declare (type boolean-pvar c1occupied c2occupied)
                 (type (field-pvar 1) temp))
        (*set temp (qchild-ref!! occupied 1 l q) c1occupied (plusp!! temp))
        (*set temp (qchild-ref!! occupied 2 l q) c2occupied (plusp!! temp))
        (*when (or!! c1occupied c2occupied) (*set occupied (!! 1)))
        (*let (xoff1 yoff1 xoff2 yoff2 dist1 dist2)

(declare (type (field-pvar (* (pvar-length xoff-pvar) 2)) dist1 dist2)
                   (type (field-pvar (pvar-length xoff-pvar)) xoff1 yoff1 xoff2 yoff2))
          (*set xoff1 (qchild-ref!! xoff-pvar 1 l q))
          (*set yoff1 (qchild-ref!! yoff-pvar 1 l q))
          (*set dist1 (offset-dist-squared!! xoff1 yoff1))
          (*set xoff2 (+!! (qchild-ref!! xoff-pvar 2 l q) (!!f (child-2-xoff l))))
```

```
    (*set yoff2 (+!! (qchild-ref!! yoff-pvar 2 l q) (!!f (child-2-yoff l))))
    (*set dist2 (offset-dist-squared!! xoff2 yoff2))
    (*cond
      ((and!! c1occupied (or!! (not!! c2occupied) (<=!! dist1 dist2)))
       (*set xoff-pvar xoff1 yoff-pvar yoff1)
       (setf (bit-ref!! link-pvar l) (!! 0)))
      ((and!! c2occupied (or!! (not!! c1occupied) (<=!! dist2 dist1)))
       (*set xoff-pvar xoff2 yoff-pvar yoff2)
       (setf (bit-ref!! link-pvar l) (!! 1))))))))))

;; The following more recent implementation of the linking algorithm
;; uses a trick with the distances to avoid explicitly establishing
;; occupancy. Also, first child operations have been eliminated, to
;; safe a few *set operations.

(*defun FLOAT-PROXIMITY
    (bitmap link-pvar dist-pvar xoff-pvar yoff-pvar q)
  (declare (type (field-pvar 1) bitmap)
           (type (field-pvar (pvar-length link-pvar)) link-pvar)
           (type (field-pvar (pvar-length dist-pvar)) dist-pvar)
           (type (field-pvar (pvar-length xoff-pvar)) xoff-pvar yoff-pvar))
  (let ((maxoff (1- (expt 2 (pvar-length xoff-pvar)))))
    (*set link-pvar (!! 0) dist-pvar (!! 0)
          xoff-pvar (if!! (zerop!! bitmap) (!!f maxoff) (!! 0))
          yoff-pvar xoff-pvar)
    (*let (xoff2 yoff2 dist1 dist2)
      (declare (type (field-pvar (* (1+ (pvar-length xoff-pvar)) 2)) dist1 dist2)
               (type (field-pvar (1+ (pvar-length xoff-pvar))) xoff2 yoff2))
      (*set dist1 (if!! (zerop!! bitmap) (!!f (* maxoff maxoff)) 2)) (!! 0)))
      (loop for l from 1 to top-linking-level do
        (*set xoff2 (+!! (qchild-ref!! xoff-pvar 2 l q maxoff) (!!f (child-2-xoff l))))
        (*set yoff2 (+!! (qchild-ref!! yoff-pvar 2 l q maxoff) (!!f (child-2-yoff l))))
        (*set dist2 (offset-dist-squared!! xoff2 yoff2))
        (*when (<!! dist2 dist1)
          (*set xoff-pvar xoff2 yoff-pvar yoff2 dist1 dist2)
          (setf (bit-ref!! link-pvar l) (!! 1)))))
      (*when (>=!! xoff-pvar (!!f maxoff))
        (*set xoff-pvar (!! 0) yoff-pvar (!! 0))))))

;;;-------------------------------------------------------------
;;;

(defsubst opposing-quad (quad)
  (select quad (1 3) (2 4) (3 1) (4 2)))

(*proclaim '(ftype (function (t t) fixnum) qneighb))

(defun qneighb (quad dim)
  (select quad
    (1 (select dim (:x 1) (:y 0)))
    (2 (select dim (:x 0) (:y -1)))
    (3 (select dim (:x -1) (:y 0)))
    (4 (select dim (:x 0) (:y 1)))))
```

```
(defmacro offset-dist!! (xoff yoff)
  `(round!! (sqrt!! (+!! (*!! ,xoff ,xoff) (*!! ,yoff ,yoff)))))

;; ADJUST-OFFSETS implements the final step that
;; establishes the descrete definition of the quadrants.

(*defun ADJUST-OFFSETS
    (bitmap xoff-pvar yoff-pvar dist-pvar quad)
   (declare (type (field-pvar 1) bitmap)
       (type (field-pvar (pvar-length dist-pvar)) dist-pvar)
       (type (field-pvar (pvar-length xoff-pvar)) xoff-pvar yoff-pvar))
   (let ((xoff (qneighb quad :x)) (yoff (qneighb quad :y)))
     (*let ((temp-xoff (!! 0)) (temp-yoff (!! 0)) (token (!! 0)) (dist (!! 0)))
       (declare (type (field-pvar 1) token)
           (type (field-pvar (pvar-length dist-pvar)) dist)
           (type (field-pvar (pvar-length xoff-pvar)) temp-xoff temp-yoff))
       (*set temp-xoff (cref!! xoff-pvar xoff yoff))
       (*set temp-yoff (cref!! yoff-pvar xoff yoff))
       (*set token (cref!! bitmap xoff yoff))
       (*set dist (max!! (cref!! xoff-pvar xoff yoff)
              (cref!! yoff-pvar xoff yoff)))
       (*cond
        ((plusp!! token)
         (*set xoff-pvar (!!f (abs xoff)))
         (*set yoff-pvar (!!f (abs yoff))))
        ((plusp!! dist)
         (*set xoff-pvar (+!! temp-xoff (!!f (abs xoff))))
         (*set yoff-pvar (+!! temp-yoff (!!f (abs yoff))))))))
   (*set dist-pvar (offset-dist!! xoff-pvar yoff-pvar)))

;; NEIGHBOR-ORIENTATION simply computes the orientation of the neighbor
;; with respect to the owner, in the range 0 to 360 degrees.

(*defun NEIGHBOR-ORIENTATION (xoff-pvar yoff-pvar dist-pvar angl-pvar quad)
   (declare (type (field-pvar (pvar-length dist-pvar)) dist-pvar)
       (type (field-pvar (pvar-length angl-pvar)) angl-pvar)
       (type (field-pvar (pvar-length xoff-pvar)) xoff-pvar yoff-pvar))
  (*set angl-pvar (!! 0))
  (*when (plusp!! dist-pvar)
    (*set angl-pvar (offset-orientation!! xoff-pvar yoff-pvar (!!f quad)))))
```

;;;----------------------------------------------------------------
;;; Using links to read values
;;;

;; The operations on this page implement the read operations.
;; It works for in place and with independent
;; storage, assuming QCHILD-REF!! is defined appropriately.

;; We pass BITMAP to this so that certain locations of a feature array
;; may be selectively read. For example, the tokens might be curve
;; terminations, while the values being read from are curve orientations
;; (i.e., a superset of the termination locations.) In other words, it ;; is possible to communicate among a subset of the locations that the
;; links were computed for by passing that subset as BITMAP.

```
(defun READ-LINK-IS (bitmap link-pvar value-pvar transfer-pvar q)
 (*locally
   (declare (type (field-pvar 1) bitmap)
       (type (field-pvar (pvar-length link-pvar)) link-pvar)
       (type (field-pvar (pvar-length value-pvar)) value-pvar)
       (type (field-pvar (pvar-length transfer-pvar)) transfer-pvar))
   (*let ((occupied bitmap) (temp-pvar value-pvar))
    (declare (type (field-pvar 1) occupied)
        (type (field-pvar (pvar-length value-pvar)) temp-pvar))
    (loop for l from 1 to top-linking-level do
     (*let ((val1 (qchild-ref!! temp-pvar 1 l q))
         (val2 (qchild-ref!! temp-pvar 2 l q)))
       (declare (type (field-pvar (pvar-length value-pvar)) val1 val2))
       (*set occupied (or01!! (qchild-ref!! occupied 1 l q)
                (qchild-ref!! occupied 2 l q)))
       (*when occupied
        (*cond
         ((zerop!! (bit-ref!! link-pvar l))
          (*set temp-pvar val1))
         (t!!
          (*set temp-pvar val2))))))
    (*set transfer-pvar
       (cref!! temp-pvar (qneighb q :x) (qneighb q :y))))))
```

;; The following version works only in place; first child operations
;; have been removed for efficiency.

```
(defun READ-LINK (bitmap link-pvar value-pvar transfer-pvar q)
 (*locally
   (declare (type (field-pvar 1) bitmap)
       (type (field-pvar (pvar-length link-pvar)) link-pvar)
       (type (field-pvar (pvar-length value-pvar)) value-pvar)
       (type (field-pvar (pvar-length transfer-pvar)) transfer-pvar))
   (*let ((occupied bitmap) (temp-pvar value-pvar))
    (declare (type (field-pvar 1) occupied)
        (type (field-pvar (pvar-length value-pvar)) temp-pvar))
    (loop for l from 1 to top-linking-level do
     (*let ((val2 (qchild-ref!! temp-pvar 2 l q)))
       (declare (type (field-pvar (pvar-length value-pvar)) val2))
       (*set occupied (or01!! (qchild-ref!! occupied 1 l q)
                (qchild-ref!! occupied 2 l q)))
       (*when occupied (*when (plusp!! (bit-ref!! link-pvar l))
         (*set temp-pvar val2)))))
    (*set transfer-pvar
       (cref!! temp-pvar (qneighb q :x) (qneighb q :y))))))
```

;; READ-LINKS is an iteration of READ-LINK across all quadrants.

```
(defun READ-LINKS (bitmap link-pvars value-pvar neighbor-value-pvars)
```

```
(loop for quad from 1 to 4
   for link-pvar in link-pvars
   for neighbor-value-pvar in neighbor-value-pvars do
   (read-link bitmap link-pvar value-pvar neighbor-value-pvar quad)))
```

---

;;; This is the operation for shifting the processing focus to to a near
;;; neighbor defined by the link in a given quadrant.

```
(defun SHIFT-TO-NEIGHBOR-DIRECT
      (link-pvars q focus &aux (link (nth (1- q) link-pvars)))
   (*locally
     (declare (type (field-pvar 1) focus)
              (type (field-pvar (pvar-length link)) link))
     (*let ((projpvar (!! 0)) (temp1 (!! 0)))
       (declare (type (field-pvar 1) projpvar temp1))
       (let ((qnx (qneighb q :x)) (qny (qneighb q :y)))
         (declare (type fixnum qnx qny))
         (setf (cref!! projpvar qnx qny) focus))
       (*set focus (!! 0))
       (loop for l from top-chunking-level downto 1 do
         (*when (plusp!! projpvar)
           (*cond
             ((zerop!! (bit-ref!! link l))
              (setf (qchild-ref!! temp1 1 l q) projpvar))
             ((plusp!! (bit-ref!! link l))
              (setf (qchild-ref!! temp1 2 l q) projpvar))))
         (*set projpvar temp1 temp1 (!! 0)))
       (*set focus projpvar))))
```

---

What is claimed:

1. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce, for each of the pixels, a respective set of near neighbor data items by operating on the data items in the body of data; each near neighbor data item of each pixel indicating a near neighbor attribute of a respective one of a plurality of zones of orientation extending from the pixel to the edge of the image, the respective zones together including all orientations with respect to the pixel; the near neighbor attribute of each zone of orientation indicating whether the zone of orientation includes a pixel that meets a near neighbor criterion;

the near neighbor attribute of a first one of the zones of orientation for a first one of the pixels indicating that the first zone includes a second pixel that meets the near neighbor criterion, the second pixel being at a distance from the first pixel, the distance from the first pixel to the second pixel being greater than one pixel.

2. The method of claim 1 in which each of the respective zones of orientation covers an equal range of orientations.

3. The method of claim 2 in which each respective zone of orientation is a quadrant.

4. The method of claim 1 in which the first pixel has four sides and has a respective neighboring pixel on each of the four sides; each respective zone of orientation is a quadrant; each of the zones of orientation including a respective one of the first pixel's neighboring pixels; none of the zones of orientation including the first pixel.

5. The method of claim 1 in which the pixel values are binary values, each having one of first and second values, one of the first and second values indicating that the respective pixel is white and the other of the first and second values indicating that the respective pixel is black; the near neighbor pixel in each zone of orientation meeting the near neighbor criterion if the respective pixel value has the first value.

6. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce a hierarchy of levels of near neighbor data items by operating on the pixel values in the body of data; each level including a respective near neighbor data item for each pixel of the image; each pixel's respective near neighbor data item at each level indicating a near neighbor attribute for the pixel; each pixel's respective near neighbor data item at each level of the hierarchy including distance data for indicating a distance from the pixel to a respective near neighbor pixel that meets a near neighbor criterion in a respective region of the image; the levels include a lowest level and a sequence of higher levels, each of the higher levels having a respective next lower level in the hierarchy; the step of operating the processor comprising substeps of:

operating on each of the pixel values in the body of data to produce a respective starting near neighbor data item for each pixel, the respective starting near neighbor data item including starting data indicating whether the pixel meets the near neighbor criterion; the lowest level of the hierarchy including the respective starting near neighbor data items; and for each of the higher levels, producing each near neighbor data item of the level by operating on a respective set of the near neighbor data items of the respective next lower level, each pixel's respective near neighbor data item at each of the higher levels indicating the near neighbor attribute for a respective region of the image;

the substep of producing each pixel's respective near neighbor data item at each of the higher levels comprising a substep of operating on the distance data of the near neighbor data items in the respective set to select the near neighbor data item whose distance data indicates a smallest distance to the respective near neighbor pixel.

7. The method of claim 6 in which the indicated near neighbor attribute for the pixel is the presence in the respective region of the image of a near neighbor pixel meeting the near neighbor criterion.

8. The method of claim 6 in which the pixel values are binary values, each having one of first and second values, one of the first and second values indicating that the respective pixel is white and the other of the first and second values indicating that the respective pixel is black; the substep of operating on each of the pixel values to produce a respective starting near neighbor data item comprising a substep of determining that each pixel meets the near neighbor criterion if the respective pixel value has the first value.

9. The method of claim 6 in which the processor includes, for each pixel, a respective processing unit; each pixel's respective processing unit producing the pixel's respective starting near neighbor data item at the lowest level and the pixel's respective near neighbor data item at each higher level.

10. The method of claim 6 in which the image is a two-dimensional image, each of the respective regions being rectangular, the distance data being for indicating a distance from a corner of the respective region to the respective near neighbor pixel.

11. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce, for a first one of the pixels, a set of near neighbor data items by operating on the data items in the body of data; each near neighbor data item indicating a near neighbor attribute of a respective zone of orientation with respect to the first pixel, the respective zones together including all orientations in the image with respect to the first pixel;

the respective zones of orientation with respect to the first pixel include first and second zones; the first zone and second zone each adjoining a ray of pixels that includes and extends from the first pixel, the first zone including all of the pixels in the ray except the first pixel, the second zone including none of the pixels in the ray.

12. The method of claim 11 in which the first zone includes an adjacent pixel adjacent to the first pixel and a near neighbor pixel meeting a near neighbor criterion with respect to the adjacent pixel; the step of operating the processor to produce the near neighbor data items comprising substeps of:

producing first offset data indicating a first offset from the adjacent pixel to the near neighbor pixel; and producing second offset data indicating a second offset from the first pixel to the near neighbor pixel by operating on the first offset data.

13. The method of claim 12 in which the near neighbor pixel is the adjacent pixel, the second offset being from the first pixel to the adjacent pixel.

14. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce, for each of the pixels, a respective set of near neighbor data items by operating on the data items in the body of data; each near neighbor data item of each pixel indicating a near neighbor attribute of a respective one of a plurality of zones of orientation with respect to the pixel, the respective zones together including all orientations in the image with respect to the pixel; the near neighbor attribute of each zone of orientation being a distance between the pixel and a near neighbor pixel in the zone of orientation that meets the near neighbor criterion.

15. The method of claim 14, further comprising a step of operating the processor to produce, for each pixel, a respective combined near neighbor data item by combining the pixel's respective set of near neighbor data items.

16. A method of operating a system that includes memory and a processor connected for accessing the memory; the method comprising steps of:

storing in the memory a respective pixel data item for each pixel of an image that includes a plurality of pixels, each pixel's respective pixel data item being stored at a respective location, each pixel's respective pixel data item including a respective value for the pixel; and operating the processor to produce a hierarchy of near neighbor data items, each near neighbor data item indicating whether a pixel meeting a near neighbor criterion is in a respective region of the image, each near neighbor data item being at the respective location of a respective one of the pixels; the hierarchy including a lowest level and a plurality of higher levels of near neighbor data items, each higher level having a respective next lower level;

the step of producing the hierarchy comprising substeps of:

operating the processor to produce a first one of the near neighbor data items at a first one of the higher levels by selecting one of a respective set of the near neighbor data items at the next lower level; the first near neighbor data item being stored at a first pixel's respective location, the selected near neighbor data item at the next lower level being at a second pixel's respective location; and operating the processor to store at the first pixel's respective location path data indicating the second pixel's respective location.

17. The method of claim 16 in which the path data is a single bit that can have one of first and second values, the first value indicating the second pixel's respective location.

18. The method of claim 16 in which the processor comprises a respective processing unit for each of the pixels, the memory including respective local memory for each processing unit, each pixel's respective location being in the respective local memory of the respective processing unit, the processing units being connected for communicating data; the path data indicating the second pixel's respective processing unit.

19. A method of operating a system that includes a plurality of processing units and, for each processing unit, respective local memory, each processing unit being connected for accessing its respective local memory; the method comprising steps of:

storing in the respective local memory of each of the processing units a respective pixel data item, the pixel data items together forming a body of data defining an image that includes a plurality of pixels, each pixel data item indicating a value of a respective one of the pixels; and producing a hierarchy of near neighbor data items, each near neighbor data item indicating whether a pixel meeting a near neighbor criterion is in a respective region of the image; the hierarchy including a lowest level and a plurality of higher levels of near neighbor data items, each higher level having a respective next lower level;

the step of producing the hierarchy comprising substeps of:

operating each of the processing units to produce a respective starting near neighbor data item for each pixel by operating on the respective pixel data item, the respective starting near neighbor data item indicating whether the pixel meets the near neighbor criterion; the lowest level of the hierarchy including the respective starting near neighbor data items; and for each of the higher levels, operating each of the processing units to produce a respective near neighbor data item of the higher level by combining a respective set of the near neighbor data items of the respective next lower level; a first one of the processing units producing a respective one of the near neighbor data items at each level by selecting one of the near neighbor data items in the respective set of the respective next lower level; the respective near neighbor data item at each level indicating whether a pixel meeting the near neighbor criterion is in the respective region of the image in accordance with the selected near neighbor data item of the respective next lower level; the selected near neighbor data item at a first one of the higher levels being produced by a second one of the processing units;

the substep of operating each of the processing units to produce a respective near neighbor data item further comprising, at the first higher level, a substep of operating the first processing unit to store first higher level path data indicating the second processing unit.

20. The method of claim 19 in which the first higher level path data is a single bit that can have one of first and second values, the first value indicating the first processing unit and the second value indicating the second processing unit.

21. The method of claim 19 in which the substep of operating each of the processing units to produce a respective near neighbor data item further comprises, at each level other than the first level, a substep of operating the first processing unit to store respective level path data for the level.

22. The method of claim 21 in which the first level path data and the respective level path data for the levels other than the first level together form a bit vector.

23. The method of claim 19 in which the processing units are connected for communicating data, the method further comprising a step of transmitting first data between processing units along a path through the hierarchy that leads to one of the processing units that produces the respective starting near neighbor data item of the pixel in the respective region of the second processing unit that meets the near neighbor criterion, the path including the first processing unit, the step of following the path further comprising operating the first processing unit to transmit the first data to the second processing unit according to the stored path data.

24. A method of operating a system that includes memory and a processor connected for accessing the memory, the method comprising steps of:

for an image that includes a plurality of pixels, storing in the memory a respective data item for each pixel, each pixel's respective data item including a pixel value for the pixel and current focus data indicating whether the pixel is a current focus pixel;

operating the processor to produce near neighbor attribute data indicating an attribute for each of a set of near neighbor pixels of a first one of the pixels and path data indicating a path from the first pixel to each of the near neighbor pixels in the set;

operating the processor to apply a criterion to the near neighbor attribute data to select one of the near neighbor pixels; and operating the processor to change the current focus data of the selected near neighbor pixel to indicate that the selected near neighbor pixel is the current focus pixel by following the path from the first pixel to the selected near neighbor pixel as indicated by the path data.

25. The method of claim 24 in which the near neighbor attribute data indicates a respective distance from the first pixel to each of the set of near neighbor pixels, the step of operating the processor to apply the criterion including a substep of selecting the near neighbor pixel whose respective distance is smallest.

26. The method of claim 24 in which the near neighbor attribute data indicates a respective relative orientation from the first pixel to each of the set of near neighbor pixels, the step of operating the processor to apply the criterion including a substep of selecting the near neighbor pixel whose respective relative orientation is closest to a given relative orientation.

27. The method of claim 24 in which the near neighbor attribute data indicates a respective attribute value for each of the set of near neighbor pixels, the first pixel also having a respective attribute value, the step of operating the processor to apply the criterion including a substep of selecting the near neighbor pixel whose respective attribute value is closest to the first pixel's respective attribute value.

28. The method of claim 24 in which the step of operating the processor to change the current focus data comprises a substep of performing a hierarchical operation.

29. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce, for a first one of the pixels, a set of near neighbor data items by operating on the data items in the body of data; each near neighbor data item indicating a near neighbor attribute of a respective zone of orientation with respect to the first pixel, the respective zones together including all orientations in the image with respect to the first pixel;

the first pixel having four sides and having a respective neighboring pixel on each of the four sides; each respective zone of orientation being a quadrant; each of the zones of orientation including a respective one of the first pixel's neighboring pixels; none of the zones of orientation including the first pixel;

each of the neighboring pixels having a respective offset from the first pixel in only one of x- and y-directions, a first one of the neighboring pixels having a respective positive offset in the x-direction, a second one of the neighboring pixels having a respective positive offset in the y-direction, a third one of the neighboring pixels having a respective negative offset in the x-direction, and a fourth one of the neighboring pixels having a respective negative offset in the y-direction; each of the zones of orientation including the respective neighboring pixel at a respective origin of the zone of orientation.

30. The method of claim 29 in which the zone of orientation that includes the first neighboring pixel extends from the first neighboring pixel in the positive x- and y-directions, the zone of orientation that includes the second neighboring pixel extends from the second neighboring pixel in the negative x-direction and in the positive y-direction, the zone of orientation that includes the third neighboring pixel extends from the third neighboring pixel in the negative x- and y-directions, and the zone of orientation that includes the fourth neighboring pixel extends from the fourth neighboring pixel in the positive x-direction and in the negative y-direction.

31. The method of claim 29 in which the zone of orientation that includes the first neighboring pixel extends from the first neighboring pixel in the positive x-direction and in the negative y-direction, the zone of orientation that includes the second neighboring pixel extends from the second neighboring pixel in the positive x- and y-directions, the zone of orientation that includes the third neighboring pixel extends from the third neighboring pixel in the negative x-direction and in the positive y-direction, and the zone of orientation that includes the fourth neighboring pixel extends from the fourth neighboring pixel in the negative x- and y-directions.

* * * * *